(12) United States Patent
Li et al.

(10) Patent No.: US 8,594,178 B2
(45) Date of Patent: Nov. 26, 2013

(54) VIDEO COMPRESSION UNDER MULTIPLE DISTORTION CONSTRAINTS

(75) Inventors: Zhen Li, Cupertino, CA (US); Alexandros Tourapis, Burbank, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 451 days.

(21) Appl. No.: 12/999,419

(22) PCT Filed: Jun. 18, 2009

(86) PCT No.: PCT/US2009/047755
§ 371 (c)(1),
(2), (4) Date: Dec. 16, 2010

(87) PCT Pub. No.: WO2009/155398
PCT Pub. Date: Dec. 23, 2009

(65) Prior Publication Data
US 2011/0103473 A1      May 5, 2011

Related U.S. Application Data

(60) Provisional application No. 61/074,430, filed on Jun. 20, 2008.

(51) Int. Cl.
*H04N 7/26* (2006.01)
*H04N 7/50* (2006.01)

(52) U.S. Cl.
USPC .................. 375/240; 375/240.12; 375/240.25

(58) Field of Classification Search
USPC ............. 375/240.12–240.18, 240.25, E7.107, 375/E7.109, E7.121, E7.153, E7.193; 702/190; 704/204, 205, E21.012; 382/162, 253
See application file for complete search history.

(56) References Cited

U.S. PATENT DOCUMENTS

5,506,686 A * 4/1996 Auyeung et al. .......... 358/426.03
5,550,590 A * 8/1996 Sakazawa et al. ......... 348/386.1

(Continued)

FOREIGN PATENT DOCUMENTS

| JP | 2007-081474 | 3/2007 |
| JP | 2009-095023 | 4/2009 |
| JP | 2010-524298 | 7/2010 |

OTHER PUBLICATIONS

He et al, "Joint Source Channel Rate-Distortion Analysis for Adaptive Mode Selection and Rate Control in Wireless Video Coding", IEEE Trans. Circuits and Systems for Video Technology, vol. 12, No. 6, Jun. 2002, pp. 511-523.*

(Continued)

*Primary Examiner* — Jay Patel
*Assistant Examiner* — Reza Aghevli
(74) *Attorney, Agent, or Firm* — Fish & Richardson P.C.

(57) ABSTRACT

Video compression is performed under multiple distortion constraints. Video coding includes determining a first set of Lagrangian cost values for multiple coding modes using a first distortion metric, determining a second set of Lagrangian cost values for the multiple coding modes using a second distortion metric, and selecting one of the coding modes based on the first set of Lagrangian cost values and the second set of Lagrangian cost values to encode a pixel block using the selected coding mode. The distortion metrics can include information associated with video display characteristics such as screen display size, video processing performance, a distortion characteristic, a temporal characteristic, or a spatial characteristic. The distortion metrics can also include characteristics of multiple video displays, such as parameters for usage, importance, design, and the technology type of the video displays.

11 Claims, 15 Drawing Sheets

(56) References Cited

U.S. PATENT DOCUMENTS

| | | | |
|---|---|---|---|
| 6,754,241 B1* | 6/2004 | Krishnamurthy et al. | 370/537 |
| 6,925,120 B2* | 8/2005 | Zhang et al. | 375/240.08 |
| 6,973,128 B2* | 12/2005 | Zhou et al. | 375/240.11 |
| 7,471,724 B2* | 12/2008 | Lee | 375/240.12 |
| 7,643,553 B2* | 1/2010 | Monaco | 375/240.06 |
| 8,116,376 B2* | 2/2012 | Boyce et al. | 375/240.16 |
| 8,160,150 B2* | 4/2012 | Moore | 375/240.16 |
| 8,300,693 B2* | 10/2012 | Flierl et al. | 375/240.16 |
| 2005/0207497 A1* | 9/2005 | Rovati et al. | 375/240.16 |
| 2005/0226335 A1* | 10/2005 | Lee et al. | 375/240.16 |
| 2006/0215760 A1 | 9/2006 | Monaco Joseph | |
| 2008/0069201 A1* | 3/2008 | Zhu et al. | 375/240.1 |

OTHER PUBLICATIONS

Zhang et al, "Joint Source-Channel Rate-Distortion Optimization for H.264 Video Coding Over Error-Prone Networks", IEEE Trans. Multimedia, vol. 9, No. 3, Apr. 2007, pp. 445-454.*

ISO/IEC JTC 1, "Coding of moving pictures and associated audio for digital storage media at up to about 1.5 Mbit/s—Part 2: Video," ISO/IEC 11172 (MPEG-1), Nov. 1993.

ITU-T and ISO/IEC JTC 1, "Generic coding of moving pictures and associated audio information—Part 2: Video," ITU-T Rec. H.262 and ISO/IEC 13818-2 (MPEG-2), Nov. 1994.

ISO/IEC JTC 1, "Coding of audio-visual objects—Part 2: Visual," ISO/IEC 14496-2 (MPEG-4 Part 2), Jan. 1999.

ITU-T, "Video codec for audiovisual services at px64 kbits/s," ITU-T Rec. H.261, v2: Mar. 1993.

ITU-T, "Video coding for low bit rate communication," ITU-T Rec. H.263, v2: Jan. 1998.

SMPTE 421M, "VC-1 Compressed Video Bitstream Format and Decoding Process", Apr. 2006.

JVT Reference software Version H.264, Karsten Suhring, HHI.

ITU-T, "Advanced Video Coding for Generic Audiovisual Services", series H: Audiovisual and Multimedia Systems; May 2003, pp. 1-282.

Shannon, "A Mathematical Theory of Communication", vol. 27, p. 1-55, Jul., Oct. 1948.

Sullivan, et al., "Rate-Distortion Optimized Motion Compensation for Video Compression Using Fixed or Variable Size Blocks", pp. 3.3.1-3.3.6; 1991.

Ortega, et al., "Rate-Distortion Methods for Image and Video Compression", Nov. 1998, pp. 23-50.

Sullivan, et al., "Rate-Distortion Optimization for Video Compression", Nov. 1998, pp. 74-90.

Everett, III, "Generalized Lagrange Multiplier Method for Solving Problems of Optimum Allocation of Resources", pp. 399-417.

Shoham, et al., "Efficient Bit Allocation for an Arbitrary Set of Quantizers", vol. 36, No. 9, Sep. 1988; pp. 1445-1453.

Chou, et al., "Entropy-Constrained Vector Quantization", vol. 37, No. 1, Jan. 1989, pp. 31-42.

Chou, et al., "Optimal Pruning With Applications to Tree-Structured Source Coding and Modeling", vol. 35, No. 2, Mar. 1989, pp. 299-315.

Lubin, et al., "Sarnoff JND Vision Model", Standards Committe, Aug. 5, 1997, pp. 1-33.

Minami, et al., "An Optimization Approach for Removing Blocking Effects in Transform Coding", vol. 5, No. 2, Apr. 1995, pp. 74-82.

Li, et al., "Performance Optimization for Motion Compensated 2D Wavelet Video Compression Techniques", 2003, pp. II-616-II-619.

Tang, "Spatiotemporal Visual Considerations for Video Coding", vol. 9, No. 2, Feb. 2007, pp. 231-238.

Ortega, et al., "Optimal Bit Allocation Under Multiple Rate Constraints", 1996, pp. 349-358.

Kalman, et al., "Rate-Distortion Optimized Video Streaming with Multiple Deadlines", 2003, pp. III-661 to III-664.

Zhang, et al., "Joint Source-Channel Rate-Distortion Optimization for H.264 Video Coding Over Error-Prone Networks", vol. 9, No. 3, Apr. 1, 2007, pp. 445-454.

Shannon, "Coding Theorems for a Discrete Source With a Fidelity Criterion", IRE National Convention Record, part 4, pp. 142-163, 1959.

Preliminary Patent Search Report Oct. 5, 2007.

* cited by examiner

VIDEO COMPRESSION UNDER MULTIPLE DISTORTION CONSTRAINTS

CROSS-REFERENCE TO RELATED APPLICATIONS

This Application claims the benefits, including priority, to related U.S. Provisional Patent Application No. 61/074,439 filed 20 Jun. 2008 by Zhen Li and Alexandros Tourapis, entitled Video Compression under Multiple Distortion Constraints, which is assigned to the Assignee of the present Application (with Dolby Laboratories Ref. No. D07014 US01).

TECHNOLOGY

The present disclosure relates generally to video technology. More particularly, embodiments of the present invention relate to video compression under multiple distortion constraints.

BACKGROUND

As used herein, the term "image feature" may refer to one or more picture elements (e.g., one or more pixels) within a field. As used herein, the term "source field" may refer to a field from which information relating to an image feature may be determined or derived. As used herein, the term "intermediate field" may refer to a field, which may temporally follow or lead a source field in a video sequence, in which information relating to an image feature may be described with reference to the source field. As used herein, the term "disparity estimation" may refer to techniques for computing motion vectors or other parametric values with which motion, e.g., between two or more fields of a video sequence, may efficiently be predicted, modeled or described. An example of disparity estimation can be motion estimation. As used herein, the term "disparity estimate" may refer to a motion vector or another estimated parametric motion related value. As used herein, the term "disparity compensation" may refer to techniques with which a motion estimate or another parameter may be used to compute a spatial shift in the location of an image feature in a source field to describe the motion or some parameter of the image feature in one or more intermediate fields of a video sequence. An example of disparity compensation can be motion compensation. The above terms may also be used in conjunction with other video coding concepts (e.g., intra prediction and illumination compensation).

BRIEF DESCRIPTION OF THE DRAWINGS

Like reference numbers and designations in the various drawings can indicate like elements.

DESCRIPTION OF EXAMPLE EMBODIMENTS

Figure 1:
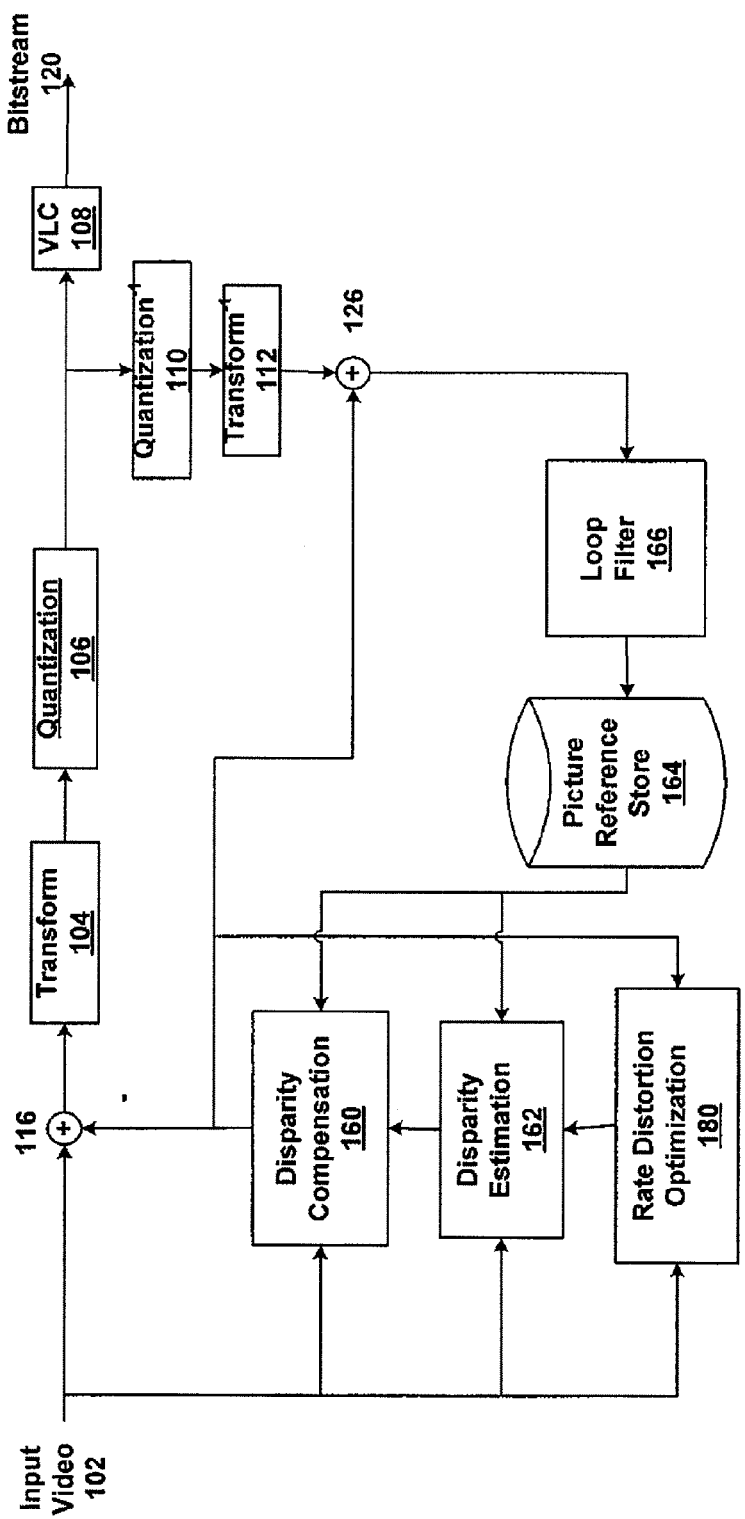
FIG. 1 depicts a diagram of an example of a video encoder.

Example embodiments relating to video compression under multiple distortion constraints are described herein. In the following description, for the purposes of explanation, numerous specific details are set forth in order to provide a thorough understanding of the present invention. It will be apparent, however, that embodiments of the present invention may be practiced without these specific details. In other instances, well-known structures and devices are shown in block diagram form in order to avoid unnecessarily obscuring the present invention.

Overview

Aspects of the disclosed techniques involve video coding optimizations under multiple distortion constraints. The optimization methods presented in this disclosure can be used to optimize various mode decisions in video compression systems, such as the selection of quantization parameters, motion vectors, intra prediction modes, coding block (e.g., macroblock) sizes, transforms, entropy coding, among others. These and other embodiments can include one or more of the following features.

In some aspects, some embodiments feature a method for video coding involves determining a first set of Lagrangian cost values for multiple coding modes using a first distortion metric, and determining a second set of Lagrangian cost values for the multiple coding modes using a second distortion metric. The method involves selecting one of the coding modes based on the first set of Lagrangian cost values and the second set of Lagrangian cost values, and encoding a pixel block using the selected coding mode.

These and other embodiments can optionally include one or more of the following features. The first and second Lagrangian cost values can include different bit target rates. The distortion metrics can include information associated with characteristics of a video display, in which the characteristics of the video display can include screen display size, a measurement of video processing performance of the video display, a distortion characteristic of a display, a temporal characteristic of the video display, or a spatial characteristic of the video display. The distortion metrics can also have information associated with characteristics of multiple video displays, the characteristics of the multiple video displays include parameters for usage of the video displays, parameters for indicating the importance of the video displays, parameters for types of design for the video displays, parameters for types of display technologies for the video displays, and parameters for ranking the video displays using any combination of the characteristics. The selection of the mode can involve selecting the first subset of distortion metrics based on associating the distortion metrics' information for the characteristic of the video display with a similar characteristic of the video display. The selection of the mode can involve ranking the multiple coding modes. The method may also involve determining a third set of Lagrangian cost values for the coding modes using a third distortion metric, and determining a fourth set of Lagrangian cost values for the coding modes using a fourth distortion metric. The method can also include selecting one of the coding modes based on the sets of Lagrangian cost values, and encoding a second pixel block using the selected coding mode.

In some aspects, some embodiments feature a method for video coding that includes sending a compressed bit stream from a video encoder to multiple channels, in which the channels include a target bit rate and multiple distortion metrics. The method involves matching one of the distortion metrics from one of the channels to a characteristic of a first video display, and sending video data to the first video display with the distortion metric that matches the characteristic of the first video display.

These and other embodiments can optionally include one or more of the following features. The distortion metrics can include information associated with characteristics of a video display, in which the characteristics include screen display size, a measurement of video processing performance of the video display, a distortion characteristic of a display, a temporal characteristic of the video display, or a spatial characteristic of the video display. The distortion metrics can also include information associated with characteristics of multiple video displays, the characteristics of the video displays can include parameters for usage of the multiple video displays, parameters for indicating the importance of one or more of the video displays, parameters for types of design for the video displays, parameters for types of display technologies for the video displays, and parameters for ranking the video displays using any combination of the characteristics.

The method can also involve, before sending the compressed bit stream, encoding a pixel block using a Lagrangian cost function, in which the Lagrangian cost function can include distortion information from the encoding that includes multiple modes with the distortion metrics that has the corresponding bit target rates. The method can include ranking the distortion metrics in each channel based on associating the distortion metrics' information for the characteristic of the video display with a similar characteristic of the first video display, in which the matching of the one distortion metric from the one channel includes selecting a highest ranked distortion metric. The method may also involve eliminating the distortion metrics that are unmatched.

In other aspects, some embodiments feature a method of video coding under multiple distortion constraints, in which the method includes associating distortion metrics to multiple candidate modes. Each of the distortion metrics are associated with a group of candidate modes. The method involves concurrently processing the candidate modes with a respective Lagrangian cost function, and for each distortion metric, ranking the candidate modes within each group according to the Lagrangian cost functions. The method involves comparing the ranking of the candidate modes amongst each group of candidate modes, selecting the group of candidate modes with a highest ranking, and selecting a target mode for a video display based on selecting a highest-ranking candidate mode within the selected group of candidate modes.

These and other embodiments can optionally include one or more of the following features. The rankings can be based on associating a characteristic of the video display with a distortion metric characteristic. The distortion metrics can include information associated with video display characteristics, in which the video display characteristics can involve screen display size, a measurement of video processing performance, a distortion characteristic, a temporal characteristic, or a spatial characteristic. The distortion metrics may also include information associated with characteristics of multiple video displays, in which the characteristics of the multiple video displays can include parameters for usage of the multiple video displays, parameters for indicating the importance of the video displays, parameters for types of design for the video displays, parameters for types of display technologies for the video displays, and parameters for ranking the video displays using any combination of the characteristics.

In other aspects, some embodiments include features for a method of video coding under multiple distortion constraints, in which the method involves processing a bit stream of video information to determine a first Lagrangian cost function for a first mode with a first distortion metric. The method includes comparing the first Lagrangian cost function with a threshold, and if the first Lagrangian cost function is greater than the threshold, eliminating the mode with the first distortion metric. If the first Lagrangian cost function is less than the threshold, the method involves determining a second Lagrangian cost function for a first mode with a second distortion metric.

These and other embodiments can optionally include one or more of the following features. The method can include comparing the second Lagrangian cost function with the threshold. If the second Lagrangian cost function is greater than the threshold, the method can involve eliminating the mode with the second distortion metric. If the second Lagrangian cost function is less than the threshold, the method can involve determining a third Lagrangian cost function for a first mode with a third distortion metric by processing the video information.

In other aspects, some embodiments include features for a method of video coding under multiple distortion constraints, in which the method involves, for a number of modes with multiple distortion metrics for each of the modes, processing a bit stream of video information to determine a Lagrangian cost function with a distortion metric for each mode. The method involves comparing each Lagrangian cost function with a threshold, and if the respective Lagrangian cost function is greater than the threshold, the method involves eliminating the respective mode with the respective distortion metric. If the respective Lagrangian cost function is less than the threshold, the method involves determining a subsequent Lagrangian cost function for a respective mode with a subsequent distortion metric. The respective Lagrangian cost functions are serially determined and compared with the threshold until all distortion metrics for all modes have been compared and/or eliminated.

These and other embodiments can optionally include one or more of the following features. The distortion metrics can include information associated with video display characteristics, in which the video display characteristics can include screen display size, a measurement of video processing performance, a distortion characteristic, a temporal characteristic, and/or a spatial characteristic. The distortion metrics can also include information associated with characteristics of multiple video displays, the characteristics of the multiple video displays includes parameters for usage of the video displays, parameters for indicating an importance of one or more of the video displays, parameters for types of design for the video displays, parameters for types of display technologies for the video displays, and parameters for ranking the multiple video displays using any combination of the characteristics. For the modes with the distortion metrics that were kept, the method can involve selecting a subset of the modes with the distortion metrics that were kept to output to a component associated with presenting the video information on a video display. The method can include adjusting a value of the threshold for one or more modes or for one or more distortion metrics. The threshold can be a function of a distortion associated with a macroblock, in which the threshold function can include a measure of a correlation of distortion for macroblocks that are neighbors of the macroblock.

In some aspects, some embodiments can feature a video coding method that includes using statistics to identify one or more coding modes that are statistically unlikely to be selected for parallel optimization coding. For the one or more coding modes that are statistically likely to be selected, the method involves processing the one or more coding modes according to the parallel optimization coding. For the one or more modes that are statistically unlikely to be selected, the method involves employing sequential optimization coding, and using a performance criteria to select a subset of modes from the parallel optimization coding and the sequential optimization coding.

These and other embodiments can optionally include one or more of the following features. The sequential optimization coding can include, for a number of distortion metrics for one or more coding modes, processing video information to determine a Lagrangian cost function with a distortion metric for each of the coding modes. The method involves comparing each respective Lagrangian cost function with a threshold, and if the respective Lagrangian cost function is greater than the threshold, the method involves eliminating the respective coding mode with the respective distortion metric. If the respective Lagrangian cost function is less than the threshold, the method involves determining a subsequent Lagrangian cost function for a respective coding mode with a subsequent distortion metric. The respective Lagrangian cost functions are serially determined and compared with the threshold until all distortion metrics for all coding modes have been compared or eliminated.

These and other embodiments can optionally include one or more of the following features. The parallel optimization coding can include concurrently accessing one or more modes with multiple distortion metrics, and associating the multiple distortion metrics to a number of candidate modes. Each of the multiple distortion metrics can be associated with a group of candidate modes. The method can include concurrently processing the candidate modes with a respective Lagrangian cost function. For each distortion metric, the method can involve ranking the candidate modes within each group according to the Lagrangian cost functions, comparing the ranking of the candidate modes amongst each group of candidate modes, selecting the group of candidate modes with a highest ranking; and selecting a target mode for a video display based on selecting a highest-ranking candidate mode within the selected group of candidate modes. The distortion metrics can include information associated with video display characteristics, in which the video display characteristics includes screen display size, a measurement of video processing performance, a distortion characteristic, a temporal characteristic, or a spatial characteristic. The distortion metrics can include information associated with characteristics of multiple video displays, in which the characteristics of the multiple video displays includes parameters for usage of the video displays, parameters for indicating an importance of any of the video displays, parameters for types of design for the video displays, parameters for types of display technologies for the video displays, and parameters for ranking the video displays using any combination of the characteristics.

In some aspects, some embodiments include features for a video coding method that includes accessing a bit stream, including a first distortion metric, concurrently processing Lagrangian cost functions for a first set of modes associated with the first distortion metric, comparing the Lagrangian cost functions of the first set of modes, in which the comparison involves a ranking of the Lagrangian cost functions of first set of modes. The method involves selecting a first subset of modes from the first set modes based on the comparison, and arranging an order of the first subset of modes based on data from a previous mode ranking. The method also involves concurrently processing Lagrangian cost functions for the first subset of modes using a second distortion metric, and comparing the Lagrangian cost functions of the first subset of modes. The comparison involves a ranking of the Lagrangian cost functions of the first subset of modes. The method involves selecting a second subset of modes from the first set modes based on the ranking of the Lagrangian cost functions of the first subset of modes, and arranging an order of the second subset of modes based on data from a previous mode ranking.

These and other embodiments can optionally include one or more of the following features. The distortion metrics can include information associated with video display characteristics, in which the video display characteristics includes screen display size, a measurement of video processing performance, a distortion characteristic, a temporal characteristic, and/or a spatial characteristic. The distortion metrics can also include information associated with characteristics of a multiple video displays, in which the characteristics of the multiple video displays include parameters for usage of the video displays, parameters for indicating an importance of any of the video displays, parameters for types of design for the video displays, parameters for types of display technologies for the video displays, and parameters for ranking the video displays using any combination of the characteristics.

In some embodiments, the disclosed techniques can optimize a bit stream for different bit rate budgets and for different end displays, each with its own display characteristics, and therefore, can provide favorable visual quality. In some of the embodiments depicted below, each channel can have a distortion metric that suits the distortion requirements, processing features, screen size, and display characteristics of particular end displays. For example, the distortion metrics for a first channel can have a first distortion metric suited for the characteristics of a particular mid-size display monitor, a second distortion metric suited for the characteristics of a display for a hand-held device, and a third distortion metric suited for the characteristics of a large, flat-screen television.

Any of the methods and techniques described herein can also be implemented in a system, an apparatus or device, a machine, a computer program product, in software, in hardware, or in any combination thereof. For example, the computer program product can be tangibly encoded on a computer-readable medium, and can include instructions to cause a data processing apparatus (e.g., a data processor) to perform one or more operations for any of the methods described herein.

To illustrate how these disclosed techniques can be implemented, several example embodiments are depicted and described. For example, some of the example video coding optimization techniques depicted and described herein include parallel optimization techniques, sequential optimization techniques, hybrid optimization techniques, and cascaded optimization techniques.

Optimization Systems and Techniques

Video compression systems and standards (e.g., ISO MPEG-1, MPEG-2, MPEG-4, MPEG-4 AVC/ITU-T H.264, H.261, H.263, and VC-1) including scalable (e.g., SVC) and multiview coding systems (e.g., MVC) can provide an approach to store and deliver video contents at a reasonable cost. Video coding optimization can be a component of video compression systems. Video coding optimization can provide high coding efficiency with a quality visual experience.

FIG. 1 depicts a diagram of an example of a video encoder 100. The encoder 100, for example, may be an encoder for the advanced video coding standard (AVC), otherwise referred to as MPEG-4 AVC or ITU-T H.264. In FIG. 1, the input video 102 is sent to an adder 116 that sums the input video frame 102 with an output of a disparity compensation (e.g., motion/illumination change compensation and/or intra-prediction) component 160. The output from the adder 116 is coupled to a transform component 104, followed by a quantization component 106. The output of the quantization component 106 is coupled to a variable length coding (VLC) component 108 and an inverse quantization component 110. The bit stream 120 results from the VLC component 108. Information about the encoding process, such as the number of bits required to encode a block, region, or image, and the distortion introduced by such decision, are sent to the loop filter 166 and other components.

The disparity compensation component 160 can generate a prediction signal given information/decisions from the disparity estimation component 162. The disparity estimation component 162 can perform tasks that may include: (a) determining the appropriate prediction parameters such as motion vectors, illumination change parameters, and/or intra prediction modes, (b) selectively enabling and disabling motion-compensation block-sizes; (c) using certain pictures as motion-compensation references; (d) adjusting the motion estimation search range, refinement patterns, and/or the number of motion estimation iterations; and (e) limiting the number of coding modes to be tested given some predefined conditions or information about the image, among others. The loop filter component 166 can perform tasks that may include: (a) adjusting the parameters of the in-loop deblocking filter; (b) switching-off the deblocking filter, among others.

The rate distortion optimization component 180 receives the input video 102 and the output from the disparity compensation component 160 to send rate distortion optimization information to the disparity estimation component 162. Disparity estimation can be characterized by a balance between minimizing the motion compensation (or prediction) error, while maximizing the coherence of the motion field. The coherence of the motion field can be expressed in terms of the motion field's smoothness. The motion for coherent objects is expected to be smooth with each object so that the motion field is only discontinuous at object boundaries. These object boundaries can be referred to as contour edges or silhouette edges.

The inverse transform component 112 receives an input from the inverse quantization component 110 and sends an output to an adder 126. The adder 126 receives the signal from the inverse transform component 112 and the disparity compensation component 160, and sends a summed signal to a loop filter 166. A picture reference store 164 receives an input from the loop filter 166, and sends an output to the disparity compensation component 160 and the disparity estimation component 162. The disparity estimation component 162 also receives an input from the rate control component (not shown). The loop filter 166 also receives an input from the rate control component. The input video 102 is also sent to an input of the disparity compensation component 160 and the disparity estimation component 262.

Figure 2:
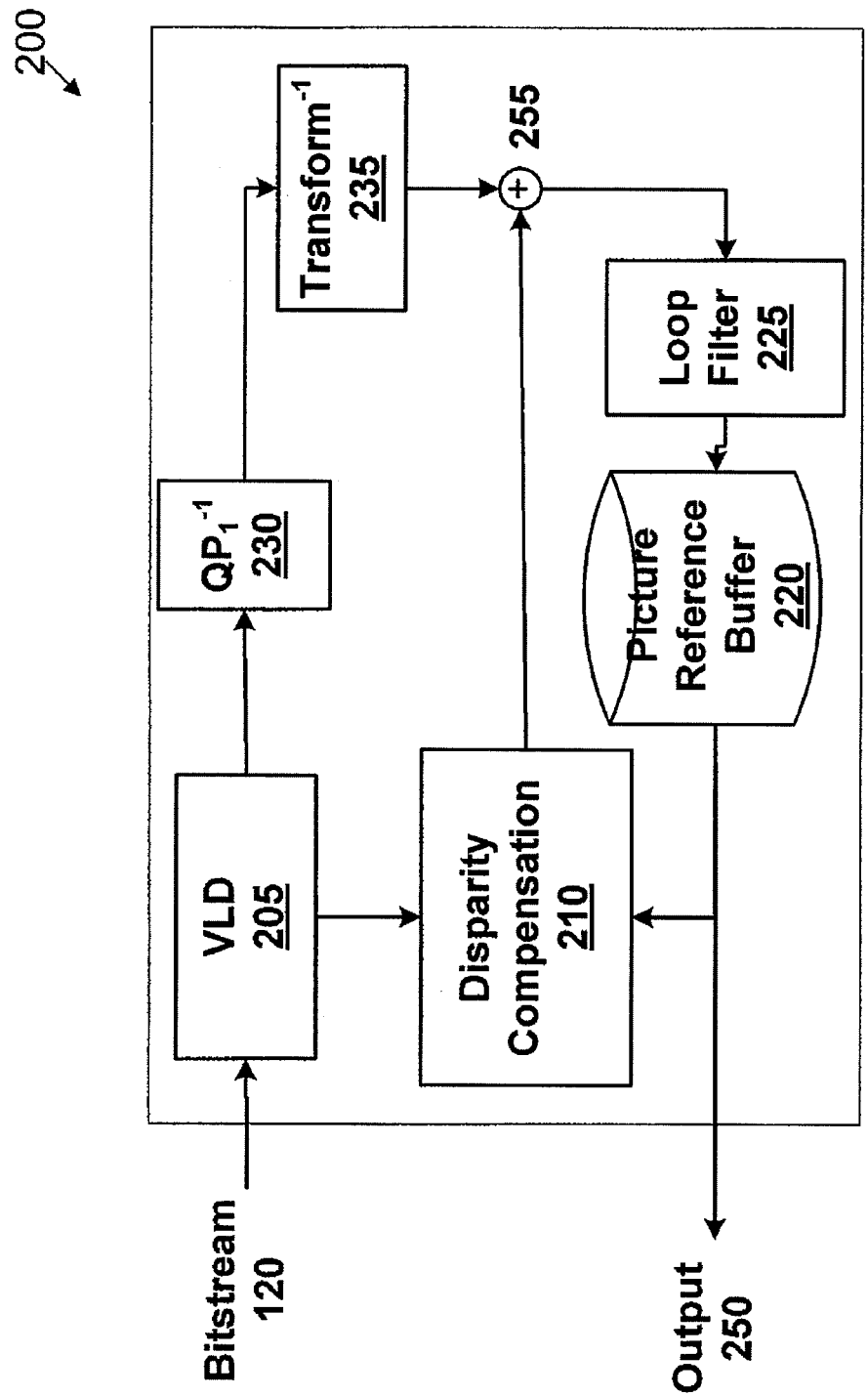
FIG. 2 depicts a diagram of an example of a video decoder.

FIG. 2 depicts a diagram of an example video decoder 200. In some embodiments, the decoder 200 may function in substantial conformity with the H.264/AVC standard. The decoder 200 receives the bit stream 120, and decodes the bit stream using an entropy (variable length) decoder 205, one or multiple inverse quantizers 230, one or multiple inverse transform components 235, and a disparity compensation component 210. The entropy decoder 205 may extract both header information, including disparity information such as modes, motion vectors, illumination change parameters, intra prediction modes, among others, and quantized and transformed residual data. Disparity compensation, and more specifically prediction of the signal, is performed in the disparity compensation component 210 using the header information, while the residual data are first dequantized using the inverse quantizer 230 and then inverse transformed using the inverse transform component 235. An adder 255 adds the output of the inverse transform 255 and the disparity compensator 210, and sends the summed result to a loop filter 225. The output of the loop filter 225 is coupled to a reference picture buffer 220, which can be used for storing pictures for reference and delivering an output 250.

Lagrangian Optimization can be used as a video coding optimization technique. Lagrangian Optimization formulates the video coding optimization issue as the minimization of the Lagrangian cost function.

Figure 3:
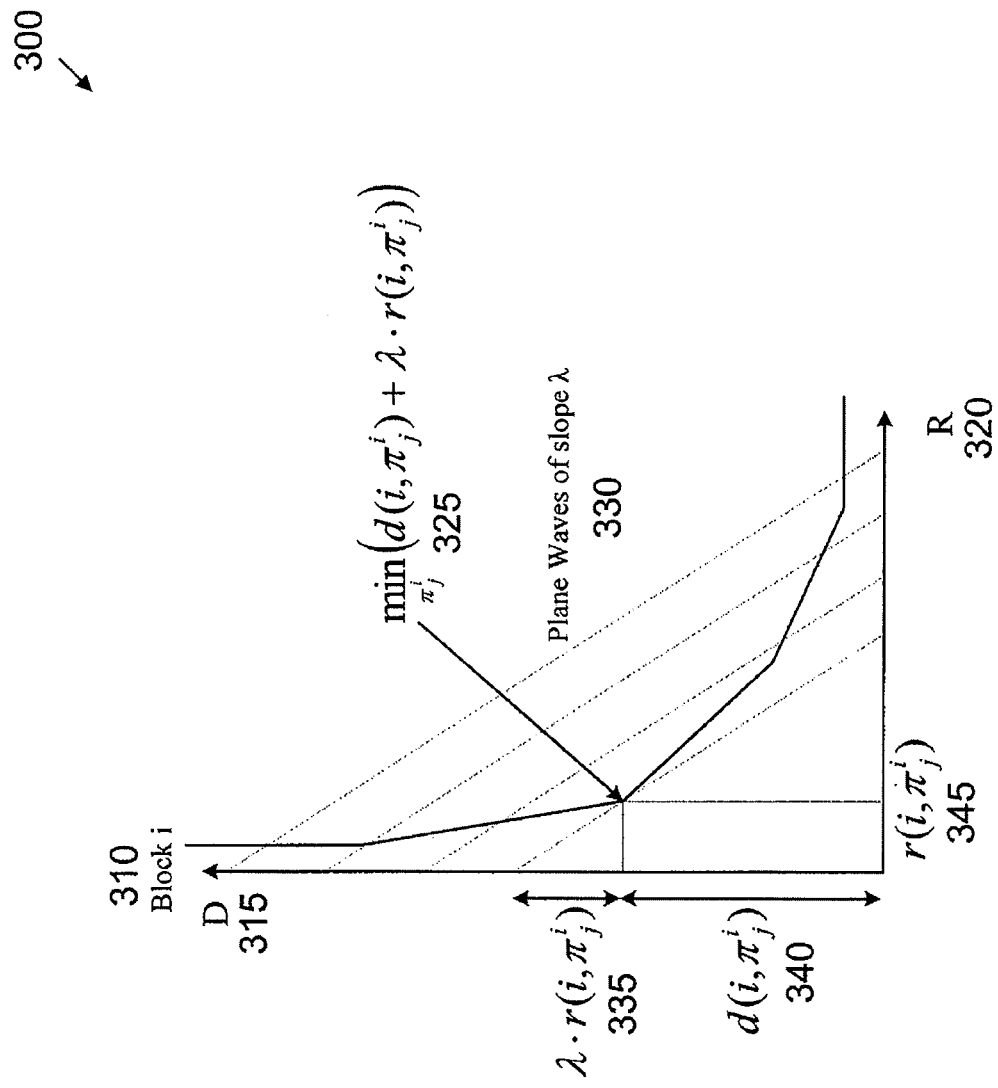
FIG. 3 is a diagram of an example of a Lagrangian optimization function.

FIG. 3 is a diagram 300 depicting an example of a Lagrangian optimization function. In particular, the Lagrangian cost function can be expressed as, $$J(\lambda, i, \pi_j^i) = d(i, \pi_j^i) + \lambda \cdot r(i, \pi_j^i), \quad (1)$$

such that $$\prod{}^* = (\pi^{1^*}, \pi^{2^*}, \ldots, \pi^{N^*}) = \underset{\Pi}{\operatorname{argmin}} \sum_{i=1}^{N} J(\lambda, i, \pi^{i^*}), \quad (2)$$

subject to a rate target $$\sum_{i=1}^{N} r(i, \pi^{i^*}) \leq R. \quad (3)$$

The index i is of one of the N blocks or groups of blocks to be optimized, $\pi_j^i$ is the different coding modes, such as different quantizers or prediction modes, $d(i, \pi_j^i)$ is the distortion of encoding the block with mode $\pi_j^i$, with $r(i, \pi_j^i)$ as the corresponding rate, and $\lambda$ is referred to as the Lagrangian multiplier, which is a nonnegative real number. $\Pi^*$ represents the optimal modes, where the overall Lagrangian cost functions are minimized.

Diagram 300 depicts a plot of distortion D 315 versus rate R 320, where the minimization of the Lagrangian cost function 325 is depicted with plane waves representing the slope of the Lagrangian multiplier 330. In particular, FIG. 3 can indicate an optimal solution when minimizing a Lagrangian cost function given a certain Lagrangian multiplier $\lambda$. In this example, a minimum point of the Lagrangian cost function 325 is at $d(i, \pi_j^i)$ 340 for the distortion of encoding the block with mode $\pi_j^i$ with $r(i, \pi_j^i)$ 345 as the corresponding rate, where $\lambda \times r(i, \pi_j^i)$ 335 is upper distortion range of one of the plane waves. Minimizing the Lagrangian cost function with $\lambda=0$ is equivalent to minimizing the distortion without any consideration of the rate. Conversely, minimizing the Lagrangian cost function with $\lambda$ arbitrarily large is equivalent to minimizing the rate without consideration of distortion. By selecting a λ value in between, a specific optimal trade-off can be achieved that balances the rate and distortion requirement. In a video compression system, both the motion vectors and coding modes can be decided with Lagrangian optimization.

When performing Lagrangian optimization in a video encoder, the rate is generally counted by bits. However, there are many methods to compute the distortion.

For instance, one widely used metric, the Sum of Absolute Differences (SAD) for an M×N block, is computed as $$SAD(s, \hat{s}) = \sum_{x=1}^{M} \sum_{y=1}^{N} |s(x, y) - \hat{s}(x, y)| \quad (4)$$

with s representing an original video block, and ŝ representing the referenced (e.g., prediction samples) or reconstructed block (e.g., prediction+encoded residual information). In another example, a Sum of the Squared Difference (SSD) metric can be computed for a M×N block as $$SSD(s, \hat{s}) = \sum_{x=1}^{M} \sum_{y=1}^{N} (s(x, y) - \hat{s}(x, y))^2, \quad (5)$$

with s representing an original video block, and ŝ representing the referenced or reconstructed block.

There can be other metrics that can measure subjective visual quality in the Lagrangian optimization. One example of these metrics includes the Just Noticeable Difference (JND), which measures the visibility of artifacts based on the contents. Another example is the Mean Square Difference of Slope (MSDS), which can be used to measure a severity of blocking artifacts that may appear within a scene.

Figure 4:
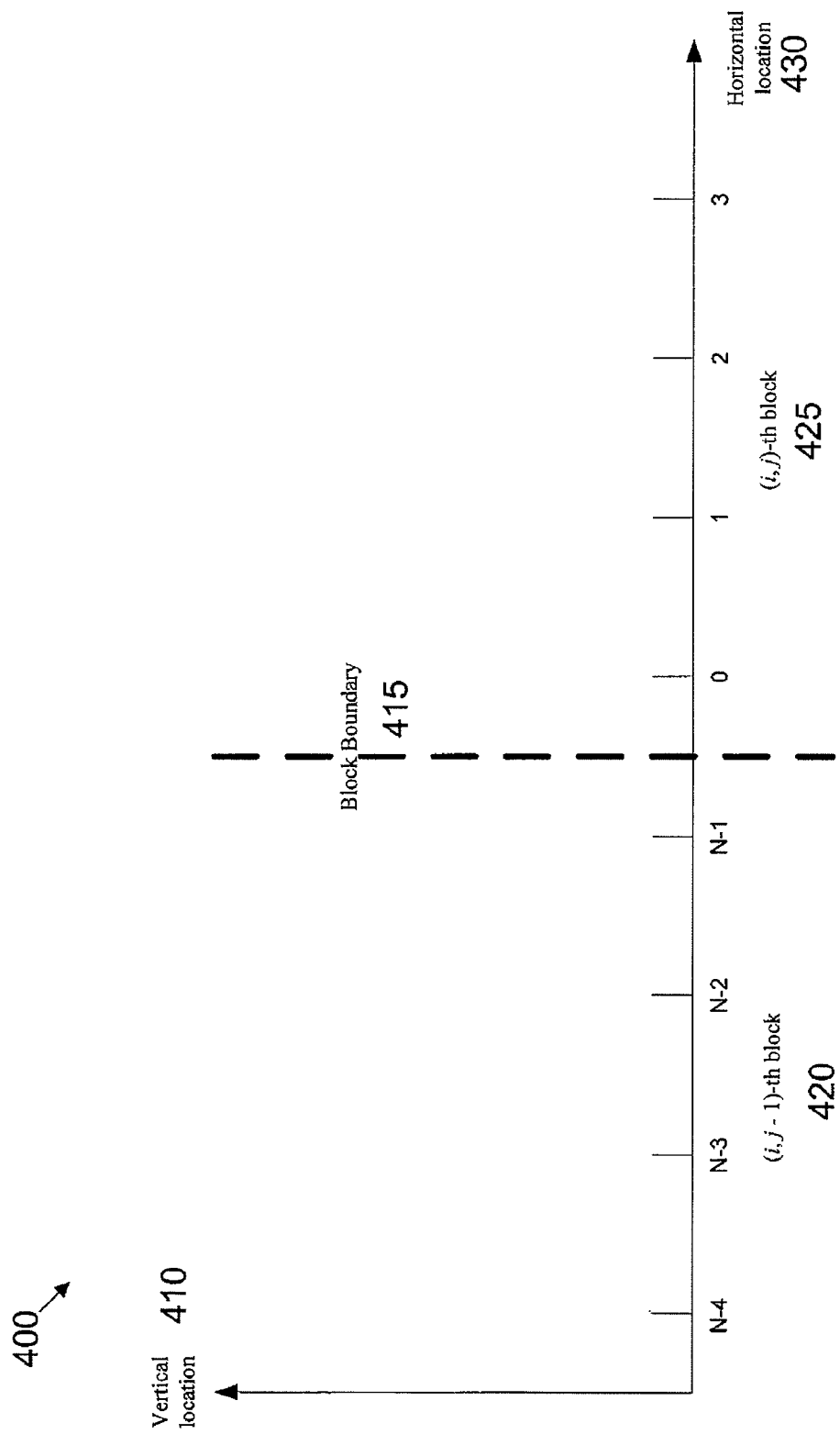
FIG. 4 is an illustration of an example Mean Square Difference of Slope (MSDS) metric along block boundaries.

FIG. 4 is a diagram 400 depicting an example Mean Square Difference of Slope (MSDS) metric 400 along block boundaries. MSDS is the square of the difference between the slopes across two adjacent blocks and the average between the slopes of each of the two blocks close to their boundaries. Diagram 400 depicts a block boundary 415 for a vertical location 410 versus a horizontal location 430, where the block boundary 415 separates the upper blocks (e.g., blocks 0, 1, 2, 3, etc.) from the lower blocks (e.g., N-1, N-2, N-3, N-4, etc.). More specifically, MSDS along the vertical block boundary 415 of the (i, j)-th block 425 and (i, j-1)-th block 420 can be expressed as $$MSDS = \sum_k \left( \frac{[x_{i,j}(k, 0) - x_{i,j-1}(k, N-1)] - \left[\begin{array}{c} x_{i,j-1}(k, N-1) - \\ x_{i,j-1}(k, N-2) \end{array}\right] - \left[\begin{array}{c} x_{i,j}(k, 1) - \\ x_{i,j-1}(k, 0) \end{array}\right]}{2} \right)^2. \quad (6)$$

Additional metrics (e.g., such as display and/or distortion metrics) can be considered in the Lagrangian cost function, for example, by expressing the Lagrangian cost as $$J(\lambda) = \sum_{k=1}^{K} \mu_k D_k(R) + \lambda \cdot R. \quad (7)$$

This function can be minimized with $\mu_k$ being the weight for the distortion metric $D_k$. Equation 7 can represent a Lagrangian function with K+1 degrees of freedom, where $\mu_k$ can be the reciprocal of a corresponding Lagrangian multiplier $\lambda_k$.

When a combined distortion metric is considered in the Lagrangian cost function, there can be tuning requirements (e.g., requirements for sophisticated processing and computations) for the Lagrangian multipliers because different distortion metrics may not present a magnitude of the distortion in a common unit. The common unit correlates or normalizes different metrics so that the different metrics can relate to each other on a similar scale or manner.

Aspects of this disclosure present an optimization methodology that considers different distortion constraints with multiple Lagrangian cost functions. For example, two types of Lagrangian cost functions are expressed in Equations 8 and 9.

More specifically, the first type of Lagrangian cost functions, $$J_k(\lambda_k) = D_k(R_k) + \lambda_k \cdot R_k, \, k=1,2,\ldots,K \quad (8)$$

is minimized, where $R_k$ is the target rate corresponding to the distortion metric $D_k$.

Some other types of Lagrangian cost functions can be used to optimize the same distortion metric with respect to different rate targets. These types of Lagrangian cost functions can be expressed as in Equation 9 below. In particular, there can be a minimization of the second type of Lagrangian cost functions, $$J_k(\lambda_k) = D(R_k) + \lambda_k \cdot R_k, \, k=1,2,\ldots,L \quad (9).$$

Figure 5:
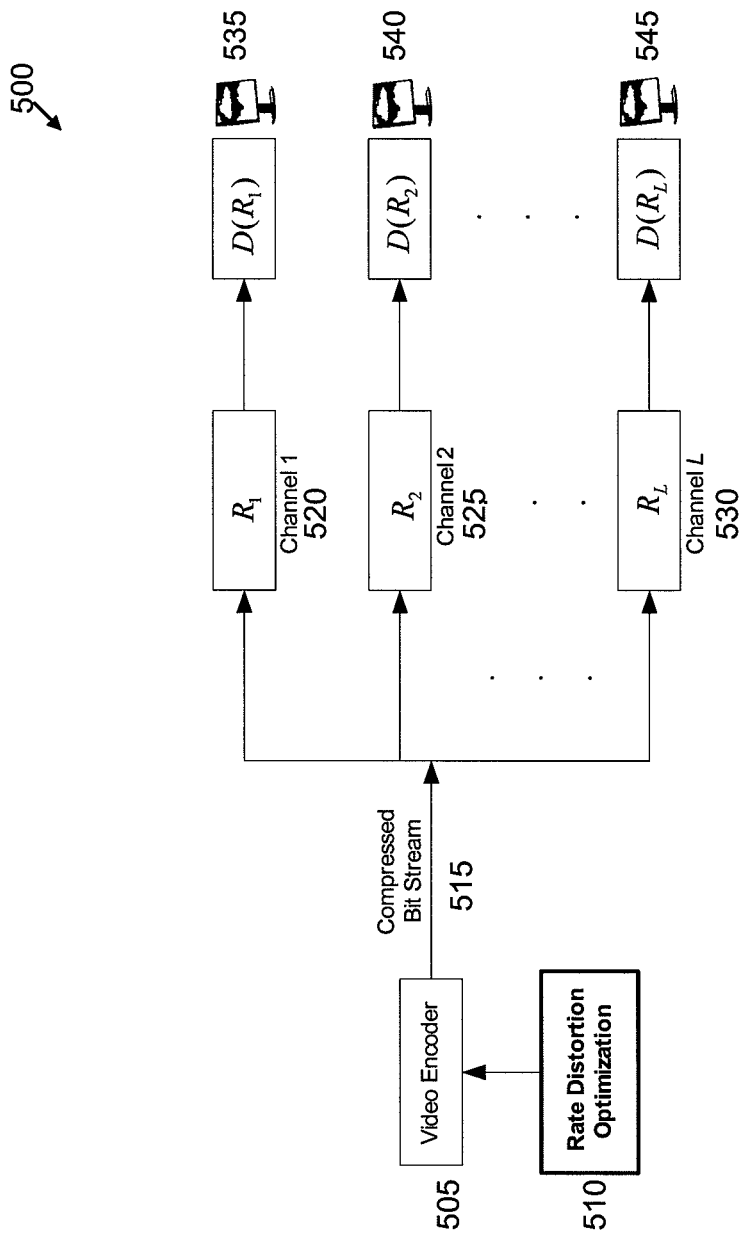
FIG. 5 depicts a diagram of an example of a video compression scheme under multiple rate constraints.

FIG. 5 depicts a diagram of an example of a video compression scheme 500 using multiple rate constraints using a single distortion constraint. In some embodiments, the rate distortion optimization component 510 sends information to a video encoder 505, which sends a compressed bit stream 515 to multiple channels 520-530. Each channel 520, 525, 530 has one distortion metric 535, 540, 545, respectively. Similar to Equation 9, the distortion can be measured with the same distortion metric D(R) and the difference in distortion values may be caused by the different target rates, $R_1, R_2, \ldots R_L$. The different rates in Equation 9 may share the same common measurement unit.

Figure 6:
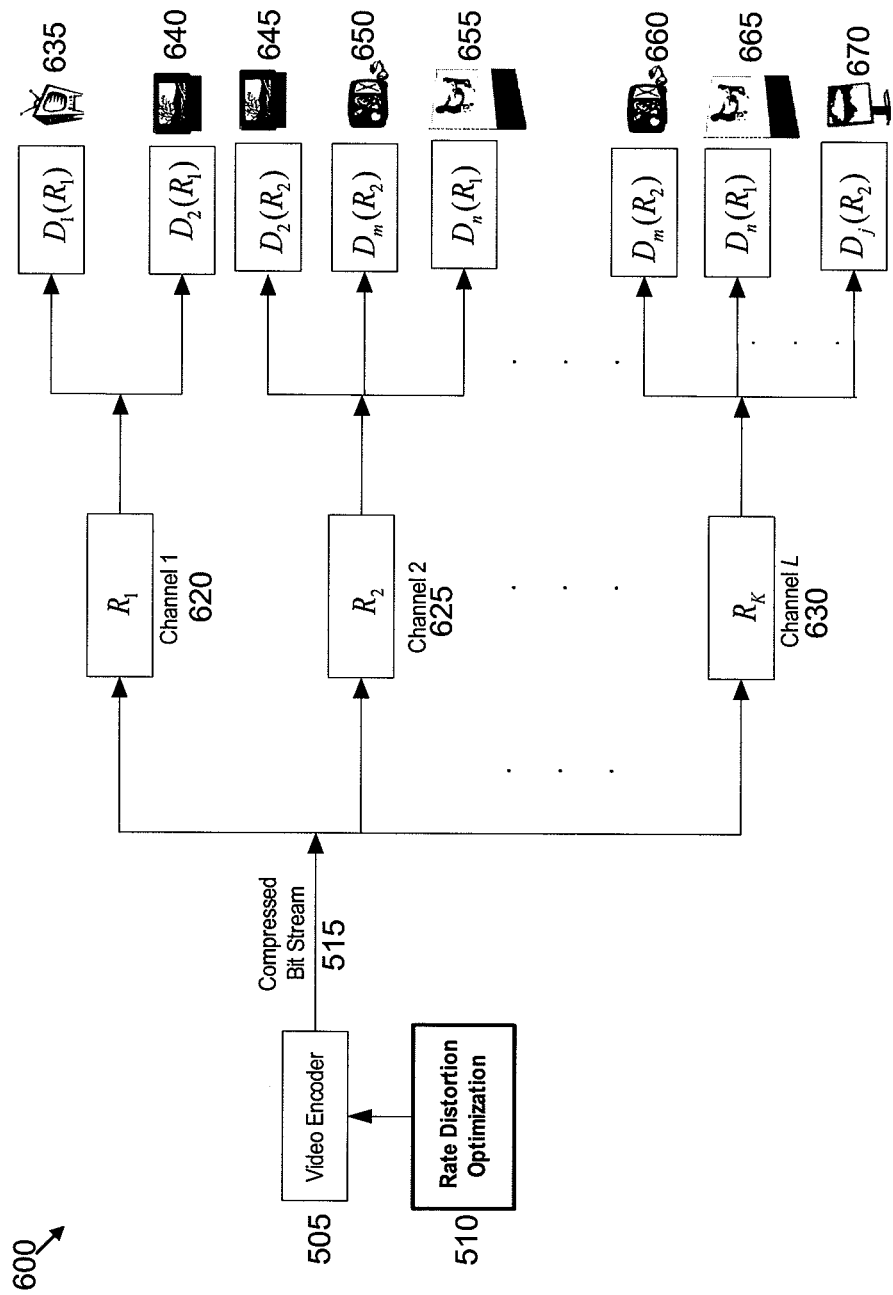
FIG. 6 depicts a diagram of an example of a video compression scheme under multiple distortion constraints.

FIG. 6 depicts a diagram of an example of a video compression scheme 600 using multiple distortion constraints for a given rate constraint. Specifically, in scheme 600, a bit stream is not only optimized for different bit rate budgets, but also for different target devices, e.g., different size, resolution, or display types including LED, Plasma, OLED, and/or DLP displays, each with its own display characteristics, and therefore, its own distortion metric. Information from the rate distortion optimization component 510 is sent to a video encoder 505, which sends a compressed bit stream 515 to multiple channels 620-630, with each channel having its own rate constraint and various end display distortion metrics 635-670. In the embodiment depicted, each channel can have a distortion metric that suits the distortion requirements, processing features, display screen size, and display characteristics of particular end displays. For example, the distortion metrics for a channel 635 with target bit rate $R_2$ can have a first distortion metric $D_2(R_2)$ 645 suited for the characteristics of a particular mid-size display monitor, a second distortion metric $D_m(R_2)$ 650 suited for the characteristics of a display for a hand-held device, and a third distortion metric $D_n(R_1)$ 655 suited for the characteristics of a large, flat-screen television.

In other embodiments, multiple distortion metrics for a given rate constraint can be employed in various application scenarios. One such application can be a video encoder that jointly optimizes the bit streams that are subsequently streamed to mobile devices with small display screens and home entertainment devices, which may have much bigger display screens. Such vast differences in display screen sizes, as well as brightness and display technology among others, can lead to very different visual evaluation criteria. For instance, it is possible that certain coding artifacts within an encoded image may be unnoticeable or appear as minor on a small display screen (e.g., a mobile phone screen or a handheld device display screen) but can be noticeable when the same content is displayed on larger display screens (e.g., a large LCD monitor, Plasma, or DLP display). Moreover, different characteristics of the display screen and the digital signal processing (DSP) performed to the image prior to viewing could also affect visual quality. The differences in display screen sizes, the characteristics of the display screen, and the DSP can be addressed by optimizing a bit stream simultaneously for different distortion metrics and/or for different display and processing characteristics.

Some aspects of this disclosure present a type of Lagrangian cost formulation that can be expansive and extensive (Equation 8) at least because this type of formulation (Equation 8) can take into account various distortion metrics $D_k$. This formulation (Equation 8) may correspond to the example shown in FIG. 6, and can take into account display characteristics (e.g., display screen size, resolution), processing characteristics (e.g., DSP), and distortion characteristics (e.g., distortion from processing macroblocks or other features). The different distortion values in Equation 8 may be caused by different target rates and/or different distortion metrics. The different distortions in Equation 8 can be measured by different distortion metrics and do not necessarily have to share a common measurement unit.

In some embodiments, the selected distortion metrics can be suited for particular distortion attributes for the various end displays. For example, one distortion metric can improve a temporal quality of a first type of display, a second distortion metric can correspond to a spatial quality of a second type of display, or a third distortion metric can be oriented towards a type of color quantity or sharpness of a third type of display. The distortion metrics can also be suited for multiple bit rate targets, and can take into account various types of display characteristics and distortion requirements.

Video coding optimizations using multiple distortion constraints can be implemented in a number of ways. To illustrate, at least four examples are depicted and described below. The video coding optimization examples include parallel optimization techniques, sequential optimization techniques, hybrid optimization techniques, and cascaded optimization techniques. Each of these methods can be characterized by different configurations and combinations of multiple optimization levels, allowing different performance and complexity tradeoffs. Although these four examples may primarily involve the type of Lagrangian cost functions of Equation 8, they may also include a combination of both of the types of Lagrangian cost functions expressed in Equation 8 and Equation 9. That is, at any optimization step multiple distortion costs can be considered instead of only a single one. In other embodiments, the same costs, but different distortion metric combinations (e.g., D1 and D2 for level one and D1 with D3 for level two) could also be considered. Some embodiments using Equation 8 may be able to decouple the decision of each distortion metric and its corresponding Lagrangian cost function.

Parallel Optimization Under Multiple Distortion Constraints

Figure 7A:
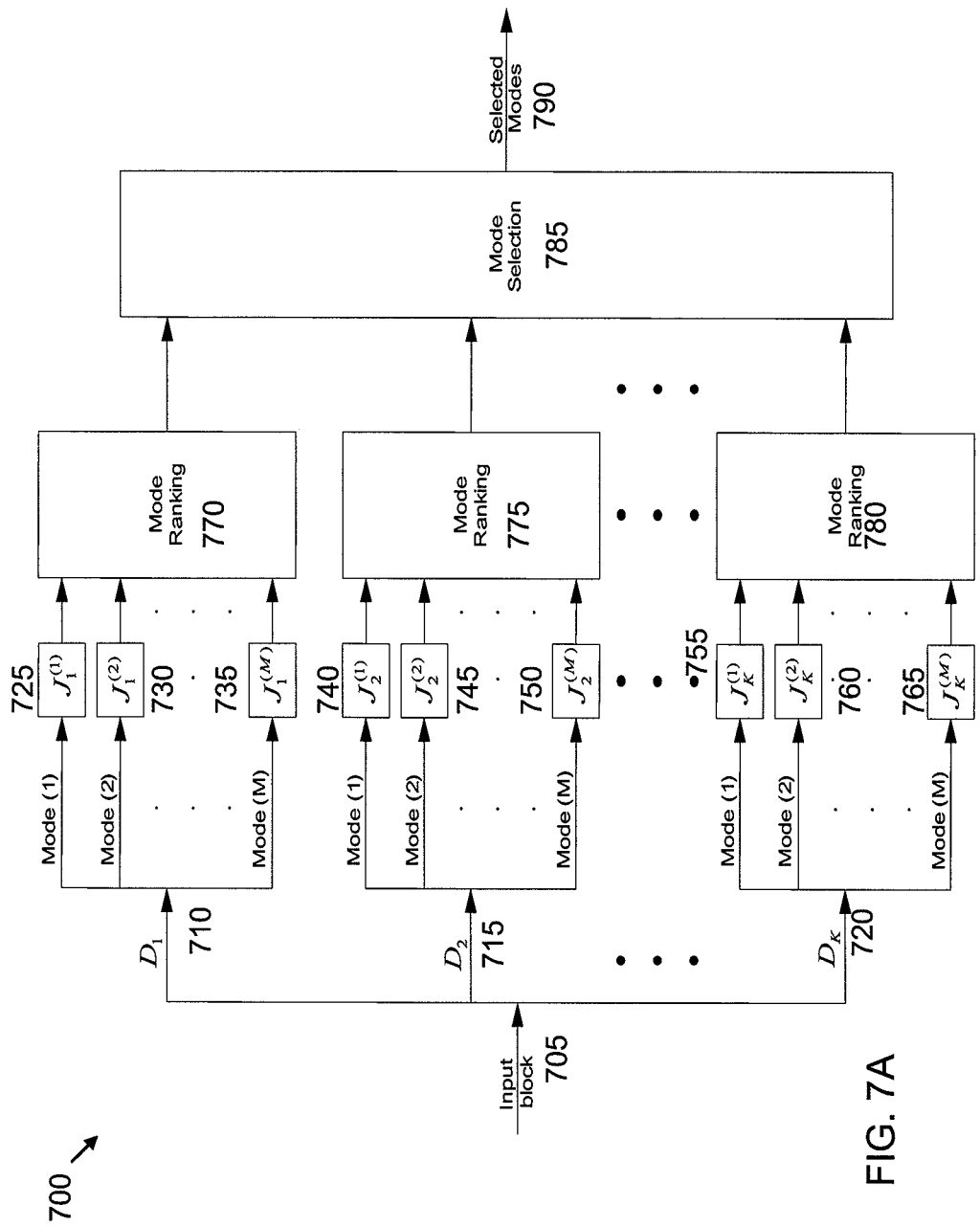
FIG. 7A depicts a diagram for an example of parallel optimization.

FIG. 7A depicts a diagram of an example video coding optimization scheme 700 employing parallel optimization under multiple distortion constraints. In scheme 700, an optimal mode is selected from M candidate modes and there are K different distortion metrics. Scheme 700 can perform Lagrangian optimization on each of the distortion metrics simultaneously.

In particular, the input block 705 sends distortion metrics 710, 715, 720 to respective candidate modes (1, 2, . . . M). For each distortion metric $D_k$, a Lagrangian cost function $j_k^{(j)}$ is processed for candidate mode j as $$J_k^{(j)}(\lambda_k) = D_k^{(j)} + \lambda_k \cdot R^{(j)}, j=1,2,\ldots,M \qquad (10).$$

For distortion metric $D_1$ 710, for example, Lagrangian cost functions 725, 730, 735, are processed for modes 1, 2, M, respectively. Once the Lagrangian cost function is computed for each mode in a given distortion metric, the resulting Lagrangian cost function is compared and ranked. Lagrangian cost function ranking modules 770, 775, 780 operate for each given distortion metric 710, 715, 720, respectively. An example of such mode ranking can involve scoring each mode for a given distortion metric based on their Lagrangian cost function. The mode with the smallest Lagrangian cost function can have score 1, the mode with the second smallest Lagrangian cost function can have score 2, and so on.

After the Lagrangian costs for every mode and every distortion metric are processed and ranked, a final mode selection module 785 chooses the mode with the best performance. In operation, the model selection module 785 can compute an overall score for each mode and choose the module with the lowest score, or it can use more complicated weighting system to decide the best mode.

Figure 7B:
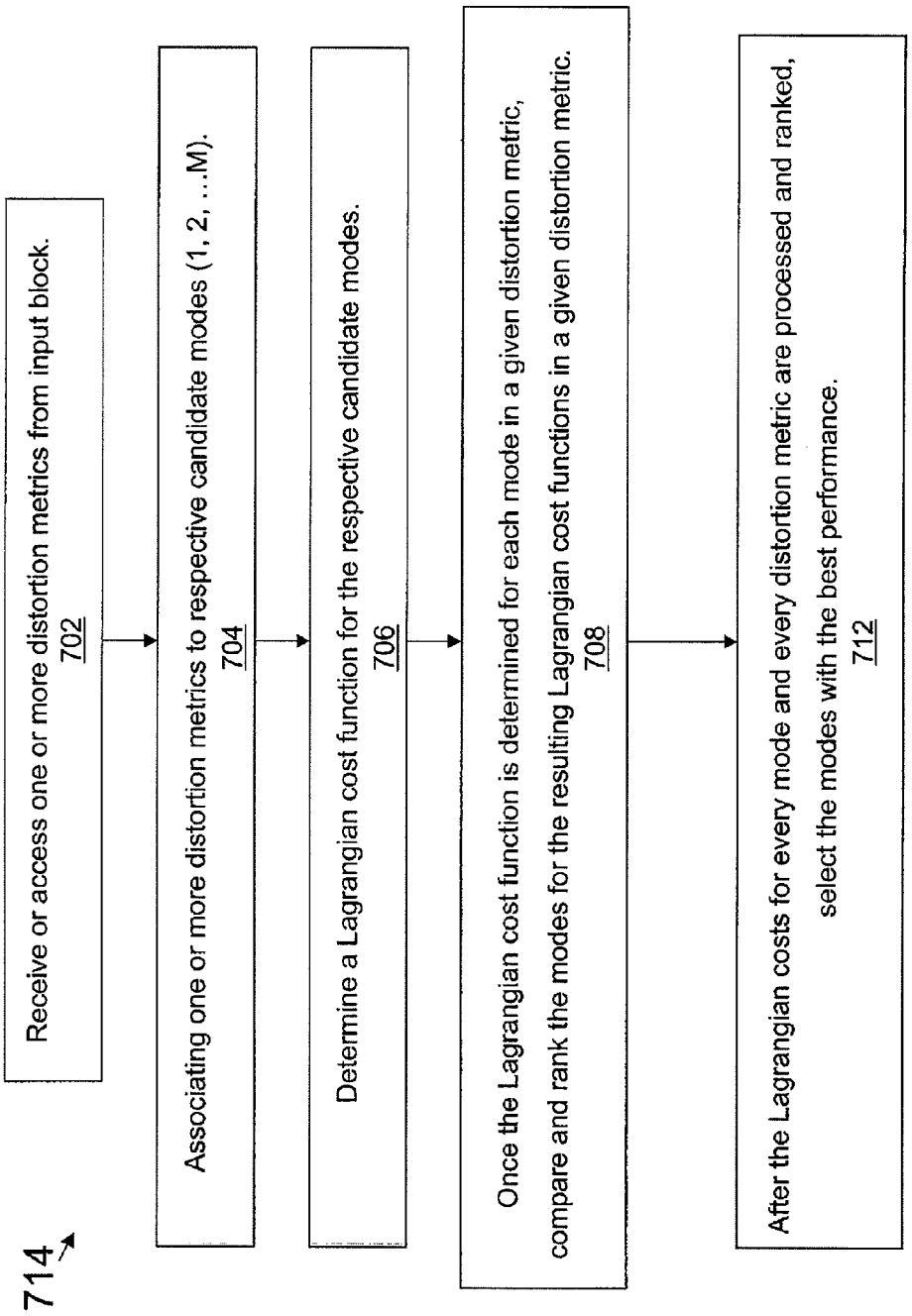
FIG. 7B depicts a flow diagram for illustrating an example process for implementing parallel optimization.

FIG. 7B depicts a flow diagram showing an example process 714 for implementing parallel optimization. The techniques in FIG. 7B involve receiving or accessing one or more distortion metrics from input block (702), associating or sending one or more distortion metrics to respective candidate modes (1, 2, . . . M) (704), and determining a Lagrangian cost function for the respective candidate modes (706). After the Lagrangian cost function is determined for each mode in a given distortion metric, process 700 includes comparing and ranking the resulting Lagrangian cost functions in a given distortion metric (708). After the Lagrangian costs for every mode and every distortion metric are processed and ranked, the techniques include selecting the modes with the best performance (712). In some cases, the best performance can refer to the overall best ranking given certain constraints of the optimization process. For example, the mode selection 785 can take the output of ranked modes 770, 775, 780, for which, in some embodiments, may generally be the ranked results (or "score") instead of the Lagrangian cost. In some of these cases, the Lagrangian cost may not be addable with respect to different distortion metrics, and the ranked results may provide another way to compare the overall performance. The selected modes can optionally be ranked or further ranked according to some other parameter or ranking scheme.

Sequential Optimization Under Multiple Distortion Constraints

Figure 8:
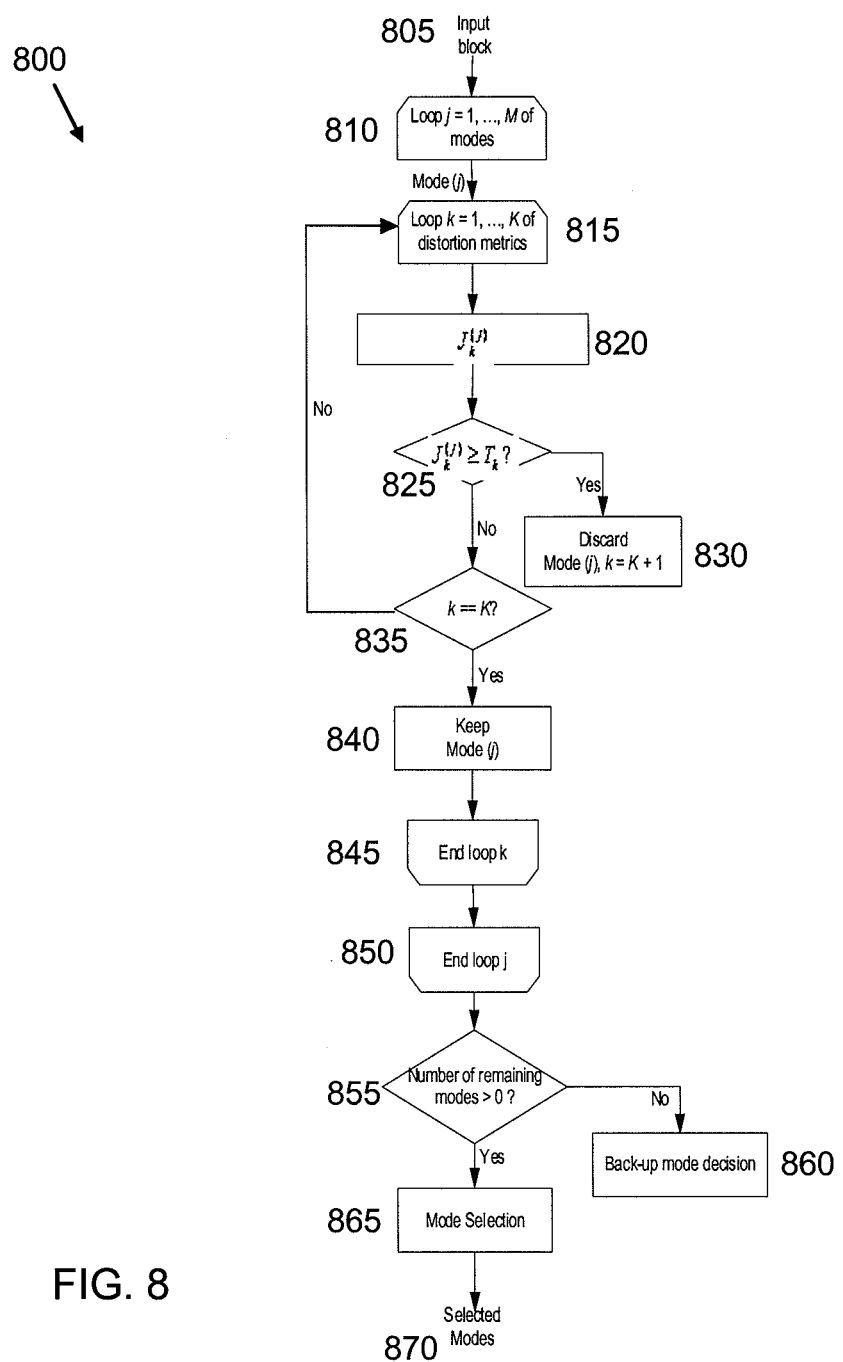
FIG. 8 depicts a diagram for illustrating an example of sequential optimization.

FIG. 8 depicts a diagram showing an example optimization process 800 employing sequential optimization under multiple distortion constraints. In the video coding process 800, an input block 805 sends distortion metrics into a sequential (e.g., one candidate mode at a time) loop of candidate modes (810), where there are M modes, Mode(j), j=1 . . . M. The distortion metrics are also sequentially looped for k=1 . . . K (815). For each of the M candidate modes, the Lagrangian cost function is determined (820) for each distortion metric sequentially as $$J_k^{(j)}(\lambda_k) = D_k^{(j)} + \lambda_k \cdot R^{(j)}, \; k=1,2,\ldots,K \quad (11).$$

After each Lagrangian cost is determined (820), it is compared with a corresponding threshold $T_k$ (825). If the Lagrangian cost function is greater than or equal to the threshold (825), this mode is discarded and no longer considered as a candidate mode (830). This discarded candidate mode can be referred to as a candidate mode that is subject to an "early termination." If the Lagrangian cost function is smaller than the threshold (825), the Lagrangian cost function corresponding to the next distortion metric can be determined (835). Such procedure continues until the mode is terminated early (830) or the Lagrangian cost functions for all distortion metrics have been computed (835).

If the Lagrangian costs for all distortion metrics have been determined (835), then mode(j) is kept, the k loop ends for the distortion metric (845), and the j loop ends for the modes (850). If the number of remaining modes is not greater than zero, then the mode decision is backed up (860). If the number of remaining modes is greater than zero, then the mode selection is performed (865) and the selected modes can be made available (870) for outputting to another system component.

The threshold $T_i$ can be predefined by the user or it can be estimated adaptively and/or adjusted during the encoding. The threshold may generally be derived as a function of global or local characteristics as $$T_i(m,n) = f(I_{global}, I_{local}), \quad (12)$$

where $I_{global}$ represents the global characteristics such as frame rate, motion intensity, and/or other metadata information, $I_{local}$ represents the local characteristics such as variance, mean of luminance component, chrominance components, texture information and/or edge information.

For the remaining modes that pass all of these threshold tests, a final mode decision module is used to select a mode or a set of modes for this block (865, 870). One example of such final mode decision module can be ranking the remaining modes with respect to one or more distortion metrics that have been computed in previous steps.

If none of the modes pass all the threshold tests, a back-up mode decision module is used (860). One example of such a back-up mode decision module involves simply selecting a preset default mode. Another example of a back-up mode decision module involves reducing the thresholds and comparing the Lagrangian cost functions again with the new thresholds until there is at least one mode that passes all the threshold tests. In another example of a back-up mode decision module, the module can choose one optimal mode that minimizes the Lagrangian cost function with respect to only one preset distortion metric.

In some embodiments, the thresholds can be used to eliminate certain modes and/or distortion metrics, and can be used to find an optimal mode and/or distortion metric. In some embodiments, a first threshold can be compared to a first distortion measurement, and if the resulted distortion is greater than a predetermined acceptable range (assuming a minimization formulation) or lesser than a predetermined acceptable range (assuming a maximization formation), then the distortion metric can be considered an outlier and can be eliminated. Then, a second distortion metric can be compared to the threshold. If the second distortion metric is not greater than a predetermined acceptable range (assuming a minimization formulation) or lesser than a predetermined acceptable range (assuming a maximization formation), then it can be kept and processed further to determine if it should be used in a subsequent selection. In other embodiments, a group of multiple distortion metrics are concurrently compared to a threshold, and the distortion metrics that are far away from the threshold can be discarded. By reducing the amount of non-optimal distortion metrics, the system processing can be improved to have faster performance.

Figure 9:
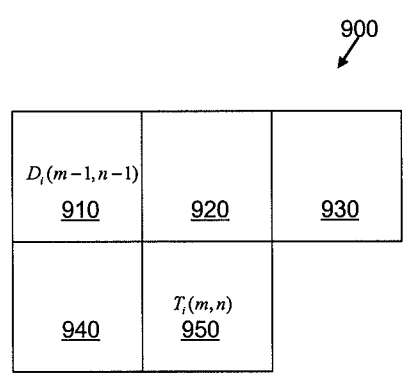
FIG. 9 depicts a diagram for illustrating an example of threshold decision under sequential optimization.

FIG. 9 depicts a diagram 900 for illustrating an example of threshold decision under sequential optimization. In this example, a threshold $T_i$ can be determined using knowledge of previous encoded and neighboring blocks. After each block (k,l) is encoded, the block's true distortion $D_i(k,l)$ can be computed with respect to distortion metric $D_i$. Then, assuming no boundary constraint, the threshold $T_i$ for the block (m,n) 950 can be decided as, $$T_i(m,n) = a \times \max(D_i(m-1,n-1), D_i(m,n-1), D_i(m+1,n-1), D_i(m-1,n)) + b \quad (13),$$

where a and b are weights that can be fixed variables or could depend on the characteristics of the block. The neighboring blocks are $D_i(m-1,n-1)$ 910, $D_i(m,n-1)$ 920, $D_i(m+1, n-1)$ 930, and $D_i(m-1,n)$ 940, where the distortion of the neighboring blocks can have correlated information that can be used to find a distortion correlation for a current block (m,n) 950.

In other embodiments, the threshold could specify if the distortion computation should be terminated immediately, or could specify how many and which additional distortion metrics should be considered. For example, if the distortion of the current block (m, n) 950 differs greatly from the distortion of its neighboring blocks, then the distortion of the current block (m, n) 950 can be considered an outlier, and can be eliminated from the optimization method to save processing resources and speed up system computations.

In some embodiments, multiple thresholds can be used for each distortion metric, where the corresponding Lagrangian cost function can be compared with each of the thresholds in a multi-stage manner. In other embodiments, the sequence of the distortion metrics can be tested, of which, thresholds can be used that depend on values from other previously tested thresholds.

In some embodiments, the thresholds can be based on local and/or global characteristics, or the thresholds can be adaptively adjusted to new threshold values during the optimization process. For example, if multiple thresholds are used, the various thresholds can be adjusted or reordered during the processing to help eliminate distortion metrics that are unlikely to be selected in the optimization process. The likelihood of selection may be based on statistics that were developed before the selection process. This embodiment can also save processing resources. In some embodiments, the weights, a and b, can be adjusted based on a refresh rate of a display, or a number of cycles that should be used during processing the optimization algorithm.

Some distortion metrics can be selected based on the importance of the distortion metric. For example, if a first distortion metric is suited for a large-screen TV display and a second distortion metric is suited for a display of a hand-held device, the second distortion metric can be selected as the more important distortion metric if a certain percentage (e.g., over 50%) of the use of the metric will likely be on a display of a hand-held device. As a result, the optimization will be based on the second distortion metric for the display of the hand-held device.

Hybrid Optimization under Multiple Distortion Constraints

The parallel and sequential schemes can be combined into a "hybrid optimization" scheme.

Figure 10A:
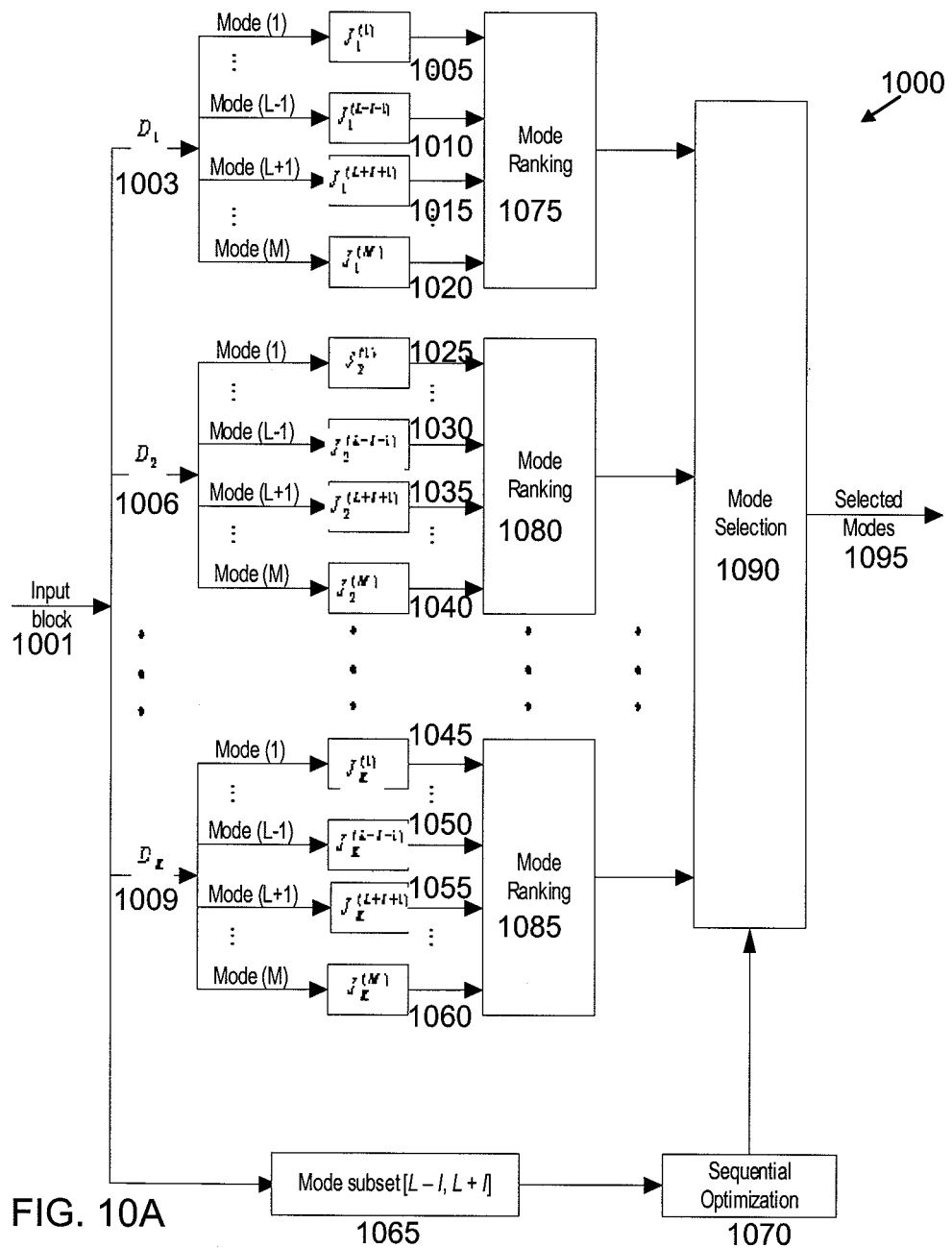
FIG. 10A depicts a diagram of an example video coding optimization scheme using hybrid optimization under multiple distortion constraints.

FIG. 10A depicts a diagram of an example video coding optimization scheme 1000 using hybrid optimization under multiple distortion constraints. In scheme 1000, the sequential optimization mode subset 1065 has modes that are less likely to be selected and used with the sequential optimization 1070. The distortion metrics $D_1$ 1003, $D_2$ 1006, $D_k$ 1009, from the input block 1001 are used in various modes 1 ... M, Lagrangian costs functions 1005-1060, and mode ranking 1075, as described above in FIGS. 7A-7B. The modes from the mode ranking 1075-1085, and the sequential optimization are taken into account during mode selection 1090 for the selected modes 1095.

In some embodiments, the mode selection 1090 can consider the modes from the parallel optimization first, and then consider the modes, if any, from the sequential optimization second. In other embodiments, the modes from the parallel optimization will always be ranked and selected higher than the modes from the sequential optimization.

Figure 10B:
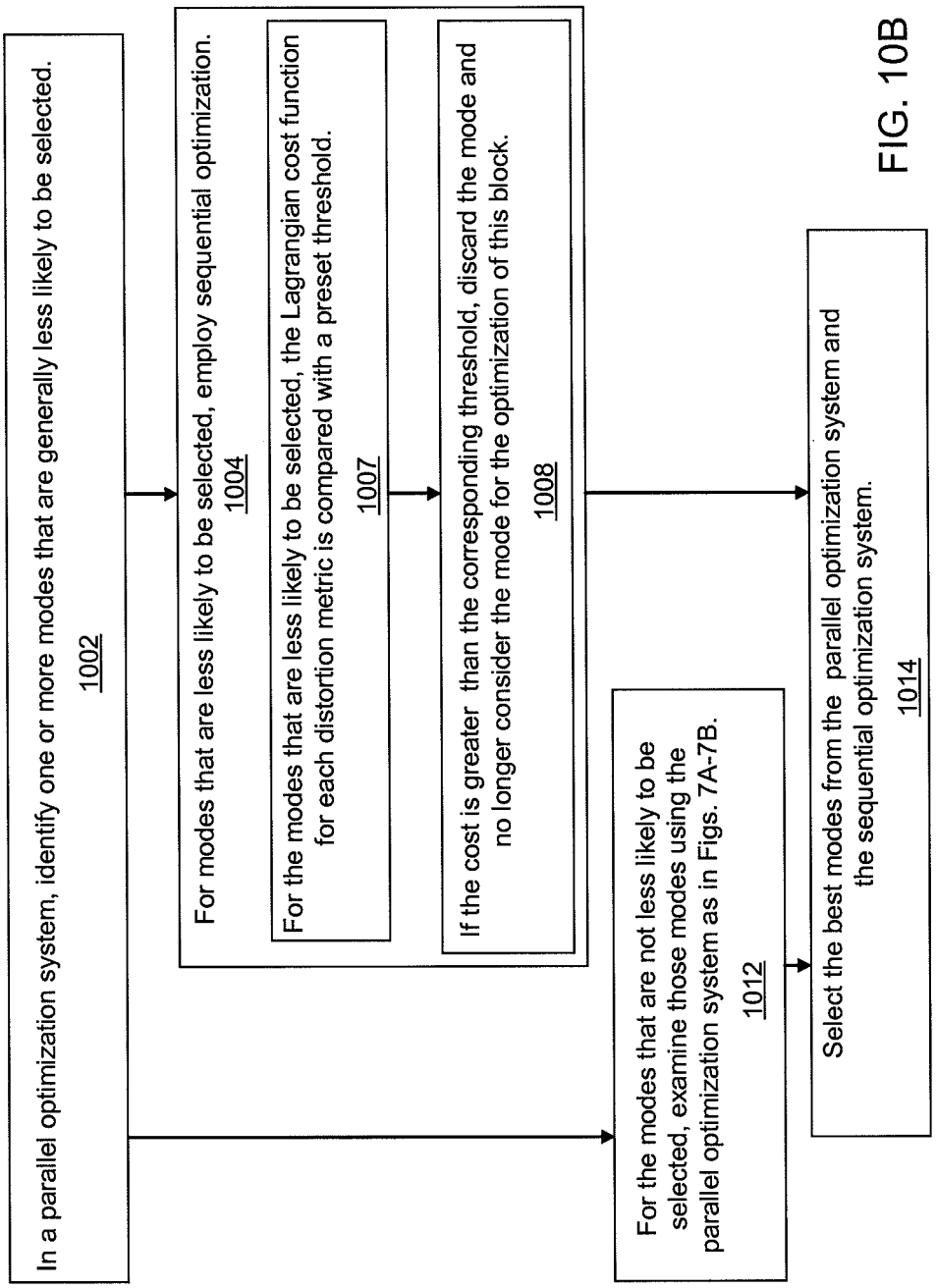
FIG. 10B depicts a flow diagram illustrating an example of a hybrid optimization technique.

FIG. 10B depicts a flow diagram illustrating an example of a hybrid optimization technique. In a parallel optimization system, for example, one or more modes can be identified that are generally less likely to be selected (1002). These modes can be assigned in a separate sequential optimization mode compared to higher likelihood modes (1004). For the modes that are less likely selected, the Lagrangian cost function for each distortion metric can be compared with a preset threshold (1007). If the cost is greater than the corresponding threshold, this mode is discarded and no longer considered for the optimization of this block (1008). All other modes can be examined using the parallel optimization system as described above in FIGS. 7A-B (1012). Then the best modes from the parallel and sequential optimization are selected (1014).

Cascaded Optimization under Multiple Distortion Constraints

Figure 11A:
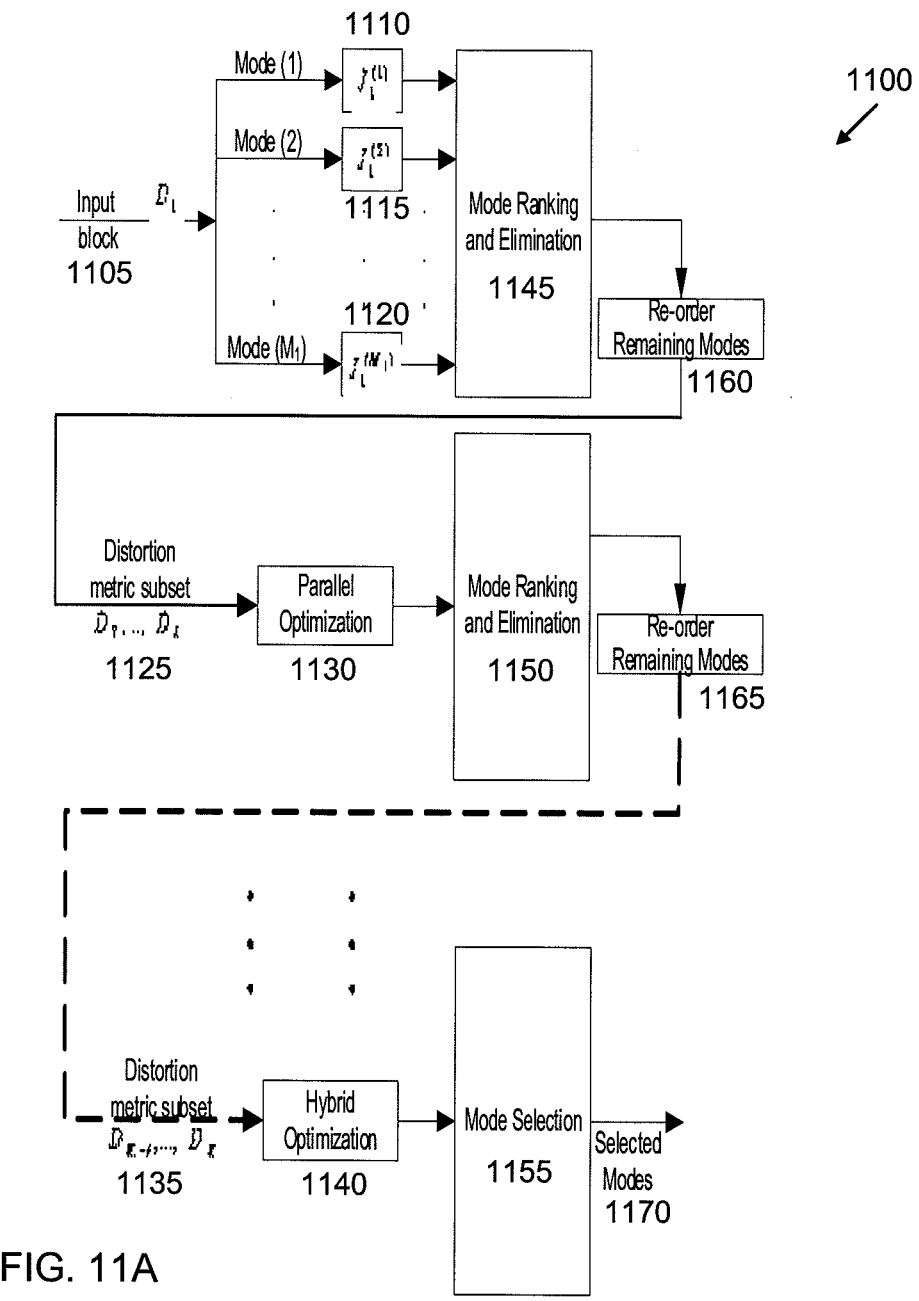
FIG. 11A depicts a diagram of an example video coding scheme using cascaded optimization under multiple distortion constraints.

FIG. 11A depicts a diagram of an example video coding scheme 1100 using cascaded optimization under multiple distortion constraints. In particular, scheme 1100 combines the parallel optimization and sequential optimization in a cascaded manner. For example, for a block to be optimized, the Lagrangian cost functions 1110-1120 for all $M_1$ modes from an input block 1105 are computed with respect to distortion metric $D_1$ and compared. The $M_2$ modes with the lowest Lagrangian costs with respect to D1 are kept, with $M_2 \geq 1$. These $M_2$ modes can be ranked and/or eliminated 1145, and then re-ordered based on the results previous rounds 1160, if any.

These $M_2$ modes are then passed to distortion metric $D_2$, where a similar procedure is performed for a subset 1125 for that metric. In that subset 1125 for the distortion metric $D_2$, parallel optimization 1130 is performed, with the Lagrangian cost functions for all modes being computed and compared. The modes with the lowest Lagrangian costs with respect to the distortion metric are kept (e.g., the $M_3$ modes with the lowest Lagrangian cost with respect to $D_2$ are kept), and then ranked and/or eliminated 1150, and then re-ordered based on any previous rounds, such as the prior round with distortion metric $D_1$.

This process can continue until all K distortion metrics have been tested, with $M_k \geq 1$, k=1, 2, ..., K. When the subset 1135 for the distortion metric $D_k$ is optimized, the optimization can be by hybrid optimization 1140. Alternatively, the optimization can be another parallel or sequential-type optimization. After the optimization 1140 is performed, the modes with the lowest Lagrangian costs with respect to the distortion metric are kept are selected 1155 and the selected modes 1170 are made available. In some embodiments, instead of having the process continue until all K distortion metrics have been tested, the process can terminate early with each step eliminating a certain number of modes until there is only one mode left. Some of the optimization methods presented in this disclosure can be used to optimize various mode decisions in video compression systems, such as the selection of quantization parameters, motion vectors, intra prediction modes, coding block sizes, transforms, entropy coding, color spaces, among others.

Figure 11B:
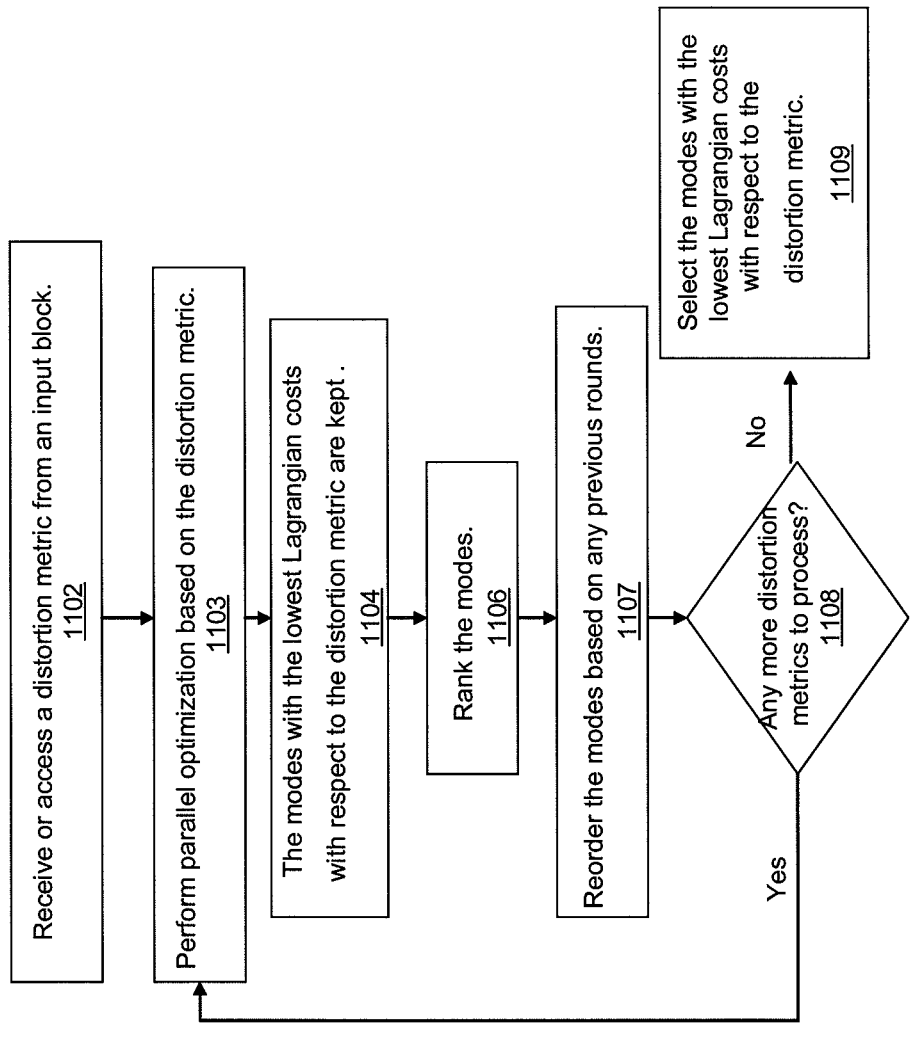
FIG. 11B depicts a flow diagram of an example process for implementing cascaded optimization.

FIG. 11B depicts a flow diagram of an example process 1112 for implementing cascaded optimization. Process 1112 invokes of receiving or accessing a distortion metric from an input block (1102), and performing parallel (or hybrid) optimization based on the distortion metric (1103). The modes with the lowest Lagrangian costs with respect to the distortion metric are kept (1104). The modes are then ranked (1106) and reordered based on results from previous rounds, if any (1107). If there are any more distortion metrics to process (1108), then the parallel (or hybrid) optimization is performed on those other distortion metrics. If there are not any more distortion metrics to process (1108), then the modes with the lowest Lagrangian costs with respect to the distortion metric are kept and selected (1109). Alternatively, this step 1109 may also be described as selecting the modes with the best performance. The modes can be selected based on the performance of the modes of the remaining distortion metric.

Example Systems

Figure 12:
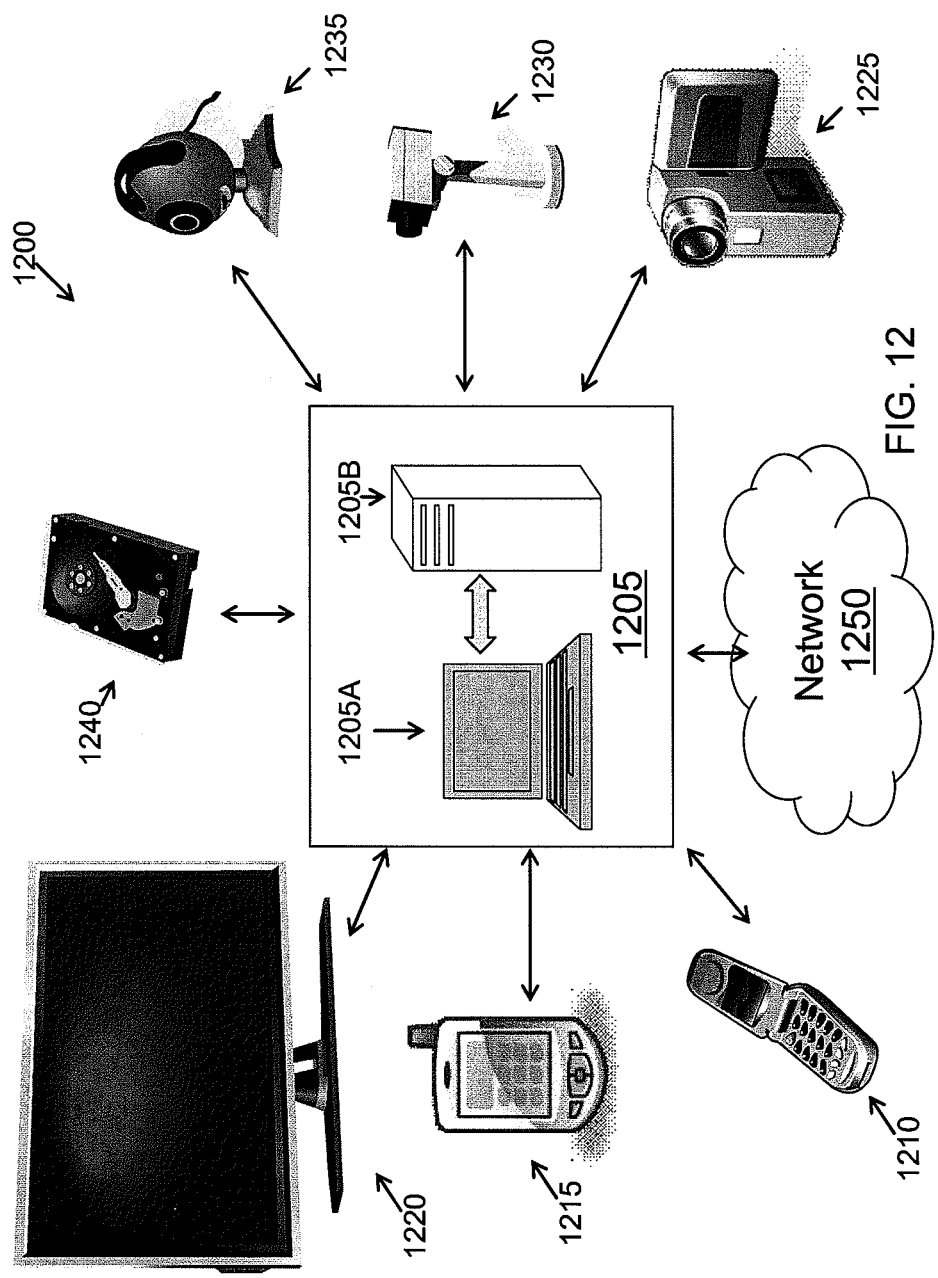
FIG. 12 depicts a system diagram with the disclosed techniques for video compression under multiple distortion constraints.

FIG. 12 depicts a system diagram that can employ any (and any combination) of the disclosed techniques for video compression under multiple distortion constraints. The disclosed techniques can be used on one or more computers 1205A, 1205B. One or more methods and/or algorithms and/or processes herein can be implemented with, or employed in computers and/or video display 1220, transmission, processing, and playback systems. The computers described herein may be any kind of computer, either general purpose, or some specific purpose computer such as a workstation. The computer 1205B may be, e.g., an Intel or AMD based computer, running Windows XP, Vista, or Linux, or may be a Macintosh computer. In some embodiments, the computer can also be, e.g., a handheld computer, such as a PDA 1215, cell phone 1215, or laptop 1205A. The computer may also refer to machines or parts of a machine for image recording or reception 1225, 1230, 1235, processing, storage 1240, and distribution of data, in particular video data.

Computer and/or graphic programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network 1250, for example, with a server or other machine sending communications to the local machine, which allows the local machine to carry out the operations described herein.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a computer readable medium for execution by, or to control the operation of, data processing apparatus. The computer readable medium can be a machine-readable storage device 1240, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows and figures described and depicted in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or another programmable logic device (PLD) such as a microcontroller, or an ASIC (application specific integrated circuit).

Processors suitable for the execution of a computer program include, by way of example, both general and special purpose microprocessors, and any one or more processors of any kind of digital computer. Generally, a processor can receive instructions and data from a read only memory or a random access memory or both. The essential elements of a computer are a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, some embodiments of the subject matter described in this specification can be implemented on a computer having a display device, e.g., a CRT (cathode ray tube), LCD (liquid crystal display), or plasma display monitor 1220, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an embodiment of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software or hardware product or packaged into multiple software or hardware products.

The term "algorithm" can refer to steps, methods, processes, schemes, procedures, operations, programs, guidelines, techniques, sequences, and/or a set of rules or instructions to achieve the results described herein. For example, an algorithm can be a set of video processing instructions for a hardware and/or software video processor. The disclosed algorithms can be related to video and can be generated, implemented, associated, and/or employed in video-related systems and/or any devices, machines, hardware, and/or articles of manufacture for the processing, compression, storage, transmission, reception, testing, calibration, display, and/or any improvement, in any combination, for video data.

The techniques and systems described herein can be further extended to the optimization in other multimedia applications, such as audio compression and processing. One or more embodiments of the various types of Lagrangian cost formulations presented in this disclosure can take into account various display, processing, and/or distortion characteristics.

Embodiments of the present invention may relate to one or more of the following enumerated example embodiments.

1. A method for video coding comprising:
determining a first set of Lagrangian cost values for a plurality of coding modes using a first distortion metric;
determining a second set of Lagrangian cost values for the plurality of coding modes using a second distortion metric;
selecting one of the plurality of coding modes based on the first set of Lagrangian cost values and the second set of Lagrangian cost values; and encoding a pixel block using the selected coding mode.
2. The method of enumerated example embodiment wherein the first and second Lagrangian cost values comprise different bit target rates.
3. The method of enumerated example embodiment wherein the distortion metrics comprise information associated with characteristics of a video display, the characteristics of the video display comprising screen display size, a measurement of video processing performance of the video display, a distortion characteristic of a display, a temporal characteristic of the video display, or a spatial characteristic of the video display.
4. The method of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.
5. The method of enumerated example embodiment wherein the selection of the mode comprises selecting the first subset of distortion metrics based on associating the distortion metrics' information for the characteristic of the video display with a similar characteristic of the video display.
6. The method of enumerated example embodiment wherein the selection of the mode comprises a ranking of the plurality of coding modes.
7. The method of enumerated example embodiment further comprising:
determining a third set of Lagrangian cost values for the plurality of coding modes using a third distortion metric;
determining a fourth set of Lagrangian cost values for the plurality of coding modes using a fourth distortion metric;
selecting one of the plurality of coding modes based on the sets of Lagrangian cost values; and encoding a second pixel block using the selected coding mode.
8. A method for video coding, comprising:
sending a compressed bit stream from a video encoder to a plurality of channels, wherein the channels comprise a target bit rate and a plurality of distortion metrics;
matching one of the distortion metrics from one of the channels to a characteristic of a first video display; and
sending video data to the first video display with the distortion metric that matches the characteristic of the first video display.
9. The method of enumerated example embodiment 0, wherein the plurality of distortion metrics comprise information associated with characteristics of a video display, the characteristics comprising screen display size, a measurement of video processing performance of the video display, a distortion characteristic of a display, a temporal characteristic of the video display, or a spatial characteristic of the video display.
10. The method of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.
11. The method of enumerated example embodiment further comprising:
before sending the compressed bit stream, encoding a pixel block using a Lagrangian cost function, wherein the Lagrangian cost function includes distortion information from the encoding that comprises a plurality of modes with the plurality of distortion metrics that has the corresponding bit target rates.
12. The method of enumerated example embodiment further comprising ranking the plurality of distortion metrics in each channel based on associating the distortion metrics' information for the characteristic of the video display with a similar characteristic of the first video display, wherein the matching of the one distortion metric from the one channel comprises selecting a highest ranked distortion metric.
13. The method of enumerated example embodiment further comprising eliminating the distortion metrics that are unmatched.
14. A method of video coding under multiple distortion constraints, the method comprising:
associating distortion metrics to a plurality of candidate modes, wherein each of the distortion metrics are associated with a group of candidate modes;
concurrently processing the plurality of candidate modes with a respective Lagrangian cost function;
for each distortion metric, ranking the candidate modes within each group according to the Lagrangian cost functions;
comparing the ranking of the candidate modes amongst each group of candidate modes;
selecting the group of candidate modes with a highest ranking; and
selecting a target mode for a video display based on selecting a highest-ranking candidate mode within the selected group of candidate modes.

15. The method of enumerated example embodiment 0, wherein the rankings are based on associating a characteristic of the video display with a distortion metric characteristic.

16. The method of enumerated example embodiment 0, wherein the distortion metrics comprise information associated with video display characteristics, the video display characteristics comprising screen display size, a measurement of video processing performance, a distortion characteristic, a temporal characteristic, or a spatial characteristic.

17. The method of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

18. A method of video coding under multiple distortion constraints, the method comprising:
processing a bit stream of video information to determine a first Lagrangian cost function for a first mode with a first distortion metric;
comparing the first Lagrangian cost function with a threshold;
if the first Lagrangian cost function is greater than the threshold, eliminating the mode with the first distortion metric; and
if the first Lagrangian cost function is less than the threshold, determining a second Lagrangian cost function for a first mode with a second distortion metric.

19. The method of enumerated example embodiment further comprising:
comparing the second Lagrangian cost function with the threshold;
if the second Lagrangian cost function is greater than the threshold, eliminating the mode with the second distortion metric; and
if the second Lagrangian cost function is less than the threshold, determining a third Lagrangian cost function for a first mode with a third distortion metric by processing the video information.

20. A method of video coding under multiple distortion constraints, the method comprising:
for a plurality of modes with a plurality of distortion metrics for each of the plurality of modes,
processing a bit stream of video information to determine a Lagrangian cost function with a distortion metric for each mode;
comparing each Lagrangian cost function with a threshold;
if the respective Lagrangian cost function is greater than the threshold, eliminating the respective mode with the respective distortion metric; and
if the respective Lagrangian cost function is less than the threshold, determining a subsequent Lagrangian cost function for a respective mode with a subsequent distortion metric,
wherein the respective Lagrangian cost functions are serially determined and compared with the threshold until all distortion metrics for all modes have been compared or eliminated.

21. The method of enumerated example embodiment wherein the distortion metrics comprise information associated with video display characteristics, the video display characteristics comprising screen display size, a measurement of video processing performance, a distortion characteristic, a temporal characteristic, or a spatial characteristic.

22. The method of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

23. The method of enumerated example embodiment wherein for the modes with the distortion metrics that were kept, the method further comprises selecting a subset of the modes with the distortion metrics that were kept to output to a component associated with presenting the video information on a video display.

24. The method of enumerated example embodiment further comprising adjusting a value of the threshold for one or more modes or for one or more distortion metrics.

25. The method of enumerated example embodiment wherein the threshold is a function of a distortion associated with a macroblock, wherein the threshold function comprises a measure of a correlation of distortion for macroblocks that are neighbors of the macroblock.

26. A video coding method, comprising:
using statistics to identify one or more coding modes that are statistically unlikely to be selected for parallel optimization coding;
for the one or more coding modes that are statistically likely to be selected, processing the one or more coding modes according to the parallel optimization coding;
for the one or more modes that are statistically unlikely to be selected, employing sequential optimization coding; and
using a performance criteria to select a subset of modes from the parallel optimization coding and the sequential optimization coding.

27. The method of enumerated example embodiment wherein the sequential optimization coding comprises:
for a plurality of distortion metrics for one or more coding modes,
processing video information to determine a Lagrangian cost function with a distortion metric for each of the coding modes;
comparing each respective Lagrangian cost function with a threshold;
if the respective Lagrangian cost function is greater than the threshold, eliminating the respective coding mode with the respective distortion metric; and
if the respective Lagrangian cost function is less than the threshold, determining a subsequent Lagrangian cost function for a respective coding mode with a subsequent distortion metric,
wherein the respective Lagrangian cost functions are serially determined and compared with the threshold until all distortion metrics for all coding modes have been compared or eliminated.

28. The method of enumerated example embodiment wherein the parallel optimization coding comprises:
concurrently accessing one or more modes with a plurality of distortion metrics;

associating the plurality of distortion metrics to a plurality of candidate modes, wherein each of the plurality of distortion metrics are associated with a group of candidate modes;

concurrently processing the plurality of candidate modes with a respective Lagrangian cost function;

for each distortion metric, ranking the plurality of candidate modes within each group according to the Lagrangian cost functions;

comparing the ranking of the candidate modes amongst each group of candidate modes;

selecting the group of candidate modes with a highest ranking; and selecting a target mode for a video display based on selecting a highest-ranking candidate mode within the selected group of candidate modes.

29. The method of enumerated example embodiment wherein the distortion metrics comprise information associated with video display characteristics, the video display characteristics comprising screen display size, a measurement of video processing performance, a distortion characteristic, a temporal characteristic, or a spatial characteristic.

30. The method of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

31. A video coding method, comprising:

accessing a bit stream comprising a first distortion metric;

concurrently processing Lagrangian cost functions for a first plurality of modes associated with the first distortion metric;

comparing the Lagrangian cost functions of the first plurality of modes, wherein the comparison involves a ranking of the Lagrangian cost functions of first plurality of modes;

selecting a first subset of modes from the first plurality of modes based on the comparison;

arranging an order of the first subset of modes based on data from a previous mode ranking;

concurrently processing Lagrangian cost functions for the first subset of modes using a second distortion metric;

comparing the Lagrangian cost functions of the first subset of modes, wherein the comparison involves a ranking of the Lagrangian cost functions of the first subset of modes;

selecting a second subset of modes from the first plurality of modes based on the ranking of the Lagrangian cost functions of the first subset of modes; and arranging an order of the second subset of modes based on data from a previous mode ranking.

32. The method of enumerated example embodiment wherein the distortion metrics comprise information associated with video display characteristics, the video display characteristics comprising screen display size, a measurement of video processing performance, a distortion characteristic, a temporal characteristic, or a spatial characteristic.

33. The method of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

34. A computer program product, tangibly encoded on a computer-readable medium, comprising instructions to cause data processing apparatus to perform operations for video coding, the operations comprising:

determining a first set of Lagrangian cost values for a plurality of coding modes using a first distortion metric;

determining a second set of Lagrangian cost values for the plurality of coding modes using a second distortion metric;

selecting one of the plurality of coding modes based on the first set of Lagrangian cost values and the second set of Lagrangian cost values; and encoding a pixel block using the selected coding mode.

35. The computer program product of enumerated example embodiment wherein the first and second Lagrangian cost values comprise different bit target rates.

36. The computer program product of enumerated example embodiment wherein the distortion metrics comprise information associated with characteristics of a video display, the characteristics of the video display comprising screen display size, a measurement of video processing performance of the video display, a distortion characteristic of a display, a temporal characteristic of the video display, or a spatial characteristic of the video display.

37. The computer program product of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

38. The computer program product of enumerated example embodiment wherein the selection of the mode comprises the operations of selecting the first subset of distortion metrics based on associating the distortion metrics' information for the characteristic of the video display with a similar characteristic of the video display.

39. The computer program product of enumerated example embodiment wherein the selection of the mode comprises operations for ranking the plurality of coding modes.

40. The computer program product of enumerated example embodiment the operations further comprising:

determining a third set of Lagrangian cost values for the plurality of coding modes using a third distortion metric;

determining a fourth set of Lagrangian cost values for the plurality of coding modes using a fourth distortion metric;

selecting one of the plurality of coding modes based on the sets of Lagrangian cost values; and encoding a second pixel block using the selected coding mode.

41. A computer program product, tangibly encoded on a computer-readable medium, comprising instructions to cause data processing apparatus to perform operations for video coding, the operations comprising:

sending a compressed bit stream from a video encoder to a plurality of channels, wherein the channels comprise a target bit rate and a plurality of distortion metrics;

matching one of the distortion metrics from one of the channels to a characteristic of a first video display; and sending video data to the first video display with the distortion metric that matches the characteristic of the first video display.

42. The computer program product of enumerated example embodiment wherein the plurality of distortion metrics comprise information associated with characteristics of a video display, the characteristics comprising screen display size, a measurement of video processing performance of the video display, a distortion characteristic of a display, a temporal characteristic of the video display, or a spatial characteristic of the video display.

43. The computer program product of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

44. The computer program product of enumerated example embodiment the operations further comprising:
before sending the compressed bit stream, encoding a pixel block using a Lagrangian cost function, wherein the Lagrangian cost function includes distortion information from the encoding that comprises a plurality of modes with the plurality of distortion metrics that has the corresponding bit target rates.

45. The computer program product of enumerated example embodiment the operations further comprising ranking the plurality of distortion metrics in each channel based on associating the distortion metrics' information for the characteristic of the video display with a similar characteristic of the first video display, wherein the matching of the one distortion metric from the one channel comprises selecting a highest ranked distortion metric.

46. The computer program product of enumerated example embodiment the operations further comprising eliminating the distortion metrics that are not matched.

47. A computer program product, tangibly encoded on a computer-readable medium, comprising instructions to cause data processing apparatus to perform operations for video coding under multiple distortion constraints, the operations comprising:
associating distortion metrics to a plurality of candidate modes, wherein each of the distortion metrics are associated with a group of candidate modes;
concurrently processing the plurality of candidate modes with a respective Lagrangian cost function;
for each distortion metric, ranking the candidate modes within each group according to the Lagrangian cost functions;
comparing the ranking of the candidate modes amongst each group of candidate modes;
selecting the group of candidate modes with a highest ranking; and
selecting a target mode for a video display based on selecting a highest-ranking candidate mode within the selected group of candidate modes.

48. The computer program product of enumerated example embodiment wherein the rankings are based on associating a characteristic of the video display with a distortion metric characteristic.

49. The computer program product of enumerated example embodiment wherein the distortion metrics comprise information associated with video display characteristics, the video display characteristics comprising screen display size, a measurement of video processing performance, a distortion characteristic, a temporal characteristic, or a spatial characteristic.

50. The computer program product of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

51. A computer program product, tangibly encoded on a computer-readable medium, comprising instructions to cause data processing apparatus to perform operations for video coding under multiple distortion constraints, the operations comprising:
processing a bit stream of video information to determine a first Lagrangian cost function for a first mode with a first distortion metric;
comparing the first Lagrangian cost function with a threshold;
if the first Lagrangian cost function is greater than the threshold, eliminating the mode with the first distortion metric; and
if the first Lagrangian cost function is less than the threshold, determining a second Lagrangian cost function for a first mode with a second distortion metric.

52. The computer program product of enumerated example embodiment the operations further comprising:
comparing the second Lagrangian cost function with the threshold;
if the second Lagrangian cost function is greater than the threshold, eliminating the mode with the second distortion metric; and
if the second Lagrangian cost function is less than the threshold, determining a third Lagrangian cost function for a first mode with a third distortion metric by processing the video information.

53. A computer program product, tangibly encoded on a computer-readable medium, comprising instructions to cause data processing apparatus to perform operations for video coding under multiple distortion constraints, the operations comprising:
for a plurality of modes with a plurality of distortion metrics for each of the plurality of modes,
processing a bit stream of video information to determine a Lagrangian cost function with a distortion metric for each mode;
comparing each Lagrangian cost function with a threshold;
if the respective Lagrangian cost function is greater than the threshold, eliminating the respective mode with the respective distortion metric; and
if the respective Lagrangian cost function is less than the threshold, determining a subsequent Lagrangian cost function for a respective mode with a subsequent distortion metric,
wherein the respective Lagrangian cost functions are serially determined and compared with the threshold until all distortion metrics for all modes have been compared or eliminated.

54. The computer program product of enumerated example embodiment wherein the distortion metrics comprise information associated with video display characteristics, the video display characteristics comprising screen display size, a measurement of video processing performance, a distortion characteristic, a temporal characteristic, or a spatial characteristic.

55. The computer program product of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

56. The computer program product of enumerated example embodiment wherein for the modes with the distortion metrics that were kept, the operations further comprises selecting a subset of the modes with the distortion metrics that were kept to output to a component associated with presenting the video information on a video display.

57. The computer program product of enumerated example embodiment the operations further comprising adjusting a value of the threshold for one or more modes or for one or more distortion metrics.

58. The computer program product of enumerated example embodiment wherein the threshold is a function of a distortion associated with a macroblock, wherein the threshold function comprises a measure of a correlation of distortion for macroblocks that are neighbors of the macroblock.

59. A video coding computer program product, tangibly encoded on a computer-readable medium, comprising instructions to cause data processing apparatus to perform operations for video coding, the operations comprising:
using statistics to identify one or more coding modes that are statistically unlikely to be selected for parallel optimization coding;
for the one or more coding modes that are statistically likely to be selected, processing the one or more coding modes according to the parallel optimization coding;
for the one or more modes that are statistically unlikely to be selected, employing sequential optimization coding; and
using a performance criteria to select a subset of modes from the parallel optimization coding and the sequential optimization coding.

60. The computer program product of enumerated example embodiment wherein the operations for sequential optimization coding comprises:
for a plurality of distortion metrics for one or more coding modes,
processing video information to determine a Lagrangian cost function with a distortion metric for each of the coding modes;
comparing each respective Lagrangian cost function with a threshold;
if the respective Lagrangian cost function is greater than the threshold, eliminating the respective coding mode with the respective distortion metric; and
if the respective Lagrangian cost function is less than the threshold, determining a subsequent Lagrangian cost function for a respective coding mode with a subsequent distortion metric,
wherein the respective Lagrangian cost functions are serially determined and compared with the threshold until all distortion metrics for all coding modes have been compared or eliminated.

61. The computer program product of enumerated example embodiment wherein the operations for the parallel optimization coding comprises:
concurrently accessing one or more modes with a plurality of distortion metrics;
associating the plurality of distortion metrics to a plurality of candidate modes, wherein each of the plurality of distortion metrics are associated with a group of candidate modes;
concurrently processing the plurality of candidate modes with a respective Lagrangian cost function;
for each distortion metric, ranking the plurality of candidate modes within each group according to the Lagrangian cost functions;
comparing the ranking of the candidate modes amongst each group of candidate modes;
selecting the group of candidate modes with a highest ranking; and
selecting a target mode for a video display based on selecting a highest-ranking candidate mode within the selected group of candidate modes.

62. The computer program product of enumerated example embodiment wherein the distortion metrics comprise information associated with video display characteristics, the video display characteristics comprising screen display size, a measurement of video processing performance, a distortion characteristic, a temporal characteristic, or a spatial characteristic.

63. The computer program product of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

64. A video coding computer program product, tangibly encoded on a computer-readable medium, comprising instructions to cause data processing apparatus to perform operations for video coding, the operations comprising:
accessing a bit stream comprising a first distortion metric;
concurrently processing Lagrangian cost functions for a first plurality of modes associated with the first distortion metric;
comparing the Lagrangian cost functions of the first plurality of modes, wherein the comparison involves a ranking of the Lagrangian cost functions of first plurality of modes;
selecting a first subset of modes from the first plurality of modes based on the comparison;
arrange an order of the first subset of modes based on data from a previous mode ranking;
concurrently processing Lagrangian cost functions for the first subset of modes using a second distortion metric;
comparing the Lagrangian cost functions of the first subset of modes, wherein the comparison involves a ranking of the Lagrangian cost functions of the first subset of modes;
selecting a second subset of modes from the first plurality of modes based on the ranking of the Lagrangian cost functions of the first subset of modes; and
arrange an order of the second subset of modes based on data from a previous mode ranking.

65. The computer program product of enumerated example embodiment wherein the distortion metrics comprise information associated with video display characteristics, the video display characteristics comprising screen display size, a measurement of video processing performance, a distortion characteristic, a temporal characteristic, or a spatial characteristic.

66. The computer program product of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

67. A system for video coding comprising one or more components for handling instructions for video coding, the one or more components to process the instructions for
determining a first set of Lagrangian cost values for a plurality of coding modes using a first distortion metric;
determining a second set of Lagrangian cost values for the plurality of coding modes using a second distortion metric;
selecting one of the plurality of coding modes based on the first set of Lagrangian cost values and the second set of Lagrangian cost values; and
encoding a pixel block using the selected coding mode.

68. The system of enumerated example embodiment wherein the first and second Lagrangian cost values comprise different bit target rates.

69. The system of enumerated example embodiment wherein the distortion metrics comprise information associated with characteristics of a video display, the characteristics of the video display comprising screen display size, a measurement of video processing performance of the video display, a distortion characteristic of a display, a temporal characteristic of the video display, or a spatial characteristic of the video display.

70. The system of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

71. The system of enumerated example embodiment wherein the instructions for the selection of the mode comprises instructions for selecting the first subset of distortion metrics based on associating the distortion metrics' information for the characteristic of the video display with a similar characteristic of the video display.

72. The system of enumerated example embodiment wherein the selection of the mode comprises instructions for ranking the plurality of coding modes.

73. The system of enumerated example embodiment the instructions further comprising:
determining a third set of Lagrangian cost values for the plurality of coding modes using a third distortion metric;
determining a fourth set of Lagrangian cost values for the plurality of coding modes using a fourth distortion metric;
selecting one of the plurality of coding modes based on the sets of Lagrangian cost values; and
encoding a second pixel block using the selected coding mode.

74. A system for video coding comprising one or more components for handling instructions for video coding, the one or more components to process the instructions for
sending a compressed bit stream from a video encoder to a plurality of channels, wherein the channels comprise a target bit rate and a plurality of distortion metrics;
matching one of the distortion metrics from one of the channels to a characteristic of a first video display; and
sending video data to the first video display with the distortion metric that matches the characteristic of the first video display.

75. The system of enumerated example embodiment wherein the plurality of distortion metrics comprise information associated with characteristics of a video display, the characteristics comprising screen display size, a measurement of video processing performance of the video display, a distortion characteristic of a display, a temporal characteristic of the video display, or a spatial characteristic of the video display.

76. The system of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

77. The system of enumerated example embodiment the instructions further comprising:
before sending the compressed bit stream, encoding a pixel block using a Lagrangian cost function, wherein the Lagrangian cost function includes distortion information from the encoding that comprises a plurality of modes with the plurality of distortion metrics that has the corresponding bit target rates.

78. The system of enumerated example embodiment the instructions further comprising ranking the plurality of distortion metrics in each channel based on associating the distortion metrics' information for the characteristic of the video display with a similar characteristic of the first video display, wherein the matching of the one distortion metric from the one channel comprises instructions for selecting a highest ranked distortion metric.

79. The system of enumerated example embodiment the instructions further comprising eliminating the distortion metrics that are unmatched.

80. A system for video coding under multiple distortion constraints, the system comprising one or more components for handling instructions for video coding, the one or more components to process the instructions for:
associating distortion metrics to a plurality of candidate modes, wherein each of the distortion metrics are associated with a group of candidate modes;
concurrently processing the plurality of candidate modes with a respective Lagrangian cost function;
for each distortion metric, ranking the candidate modes within each group according to the Lagrangian cost functions;
comparing the ranking of the candidate modes amongst each group of candidate modes;
selecting the group of candidate modes with a highest ranking; and selecting a target mode for a video display based on selecting a highest-ranking candidate mode within the selected group of candidate modes.

81. The system of enumerated example embodiment wherein the rankings are based on associating a characteristic of the video display with a distortion metric characteristic.

82. The system of enumerated example embodiment wherein the distortion metrics comprise information associated with video display characteristics, the video display characteristics comprising screen display size, a measurement of video processing performance, a distortion characteristic, a temporal characteristic, or a spatial characteristic.

83. The system of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

84. A system of video coding under multiple distortion constraints, the system comprising one or more components for handling instructions for video coding, the one or more components to process the instructions for processing a bit stream of video information to determine a first Lagrangian cost function for a first mode with a first distortion metric;

comparing the first Lagrangian cost function with a threshold;

if the first Lagrangian cost function is greater than the threshold, eliminating the mode with the first distortion metric; and if the first Lagrangian cost function is less than the threshold, determining a second Lagrangian cost function for a first mode with a second distortion metric.

85. The system of enumerated example embodiment the instructions further comprising:

comparing the second Lagrangian cost function with the threshold;

if the second Lagrangian cost function is greater than the threshold, eliminating the mode with the second distortion metric; and if the second Lagrangian cost function is less than the threshold, determining a third Lagrangian cost function for a first mode with a third distortion metric by processing the video information.

86. A system of video coding under multiple distortion constraints, the system comprising one or more components to process instructions comprising:

for a plurality of modes with a plurality of distortion metrics for each of the plurality of modes, processing a bit stream of video information to determine a Lagrangian cost function with a distortion metric for each mode;

comparing each Lagrangian cost function with a threshold;

if the respective Lagrangian cost function is greater than the threshold, eliminating the respective mode with the respective distortion metric; and if the respective Lagrangian cost function is less than the threshold, determining a subsequent Lagrangian cost function for a respective mode with a subsequent distortion metric, wherein the respective Lagrangian cost functions are serially determined and compared with the threshold until all distortion metrics for all modes have been compared or eliminated.

87. The system of enumerated example embodiment wherein the distortion metrics comprise information associated with video display characteristics, the video display characteristics comprising screen display size, a measurement of video processing performance, a distortion characteristic, a temporal characteristic, or a spatial characteristic.

88. The system of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

89. The system of enumerated example embodiment wherein for the modes with the distortion metrics that were kept, the system further comprises selecting a subset of the modes with the distortion metrics that were kept to output to a component associated with presenting the video information on a video display.

90. The system of enumerated example embodiment the instructions further comprising adjusting a value of the threshold for one or more modes or for one or more distortion metrics.

91. The system of enumerated example embodiment wherein the threshold is a function of a distortion associated with a macroblock, wherein the threshold function comprises a measure of a correlation of distortion for macroblocks that are neighbors of the macroblock.

92. A video coding system for video coding under multiple distortion constraints, the system comprising one or more components for handling instructions for video coding, the one or more components to process the instructions for:

using statistics to identify one or more coding modes that are statistically unlikely to be selected for parallel optimization coding;

for the one or more coding modes that are statistically likely to be selected, processing the one or more coding modes according to the parallel optimization coding;

for the one or more modes that are statistically unlikely to be selected, employing sequential optimization coding; and using a performance criteria to select a subset of modes from the parallel optimization coding and the sequential optimization coding.

93. The system of enumerated example embodiment wherein the instructions for the sequential optimization coding comprises:

for a plurality of distortion metrics for one or more coding modes, processing video information to determine a Lagrangian cost function with a distortion metric for each of the coding modes;

comparing each respective Lagrangian cost function with a threshold;

if the respective Lagrangian cost function is greater than the threshold, eliminating the respective coding mode with the respective distortion metric; and if the respective Lagrangian cost function is less than the threshold, determining a subsequent Lagrangian cost function for a respective coding mode with a subsequent distortion metric, wherein the respective Lagrangian cost functions are serially determined and compared with the threshold until all distortion metrics for all coding modes have been compared or eliminated.

94. The system of enumerated example embodiment wherein the instructions for parallel optimization coding comprises:
concurrently accessing one or more modes with a plurality of distortion metrics;
associating the plurality of distortion metrics to a plurality of candidate modes, wherein each of the plurality of distortion metrics are associated with a group of candidate modes;
concurrently processing the plurality of candidate modes with a respective Lagrangian cost function;
for each distortion metric, ranking the plurality of candidate modes within each group according to the Lagrangian cost functions;
comparing the ranking of the candidate modes amongst each group of candidate modes;
selecting the group of candidate modes with a highest ranking; and
selecting a target mode for a video display based on selecting a highest-ranking candidate mode within the selected group of candidate modes.

95. The system of enumerated example embodiment wherein the distortion metrics comprise information associated with video display characteristics, the video display characteristics comprising screen display size, a measurement of video processing performance, a distortion characteristic, a temporal characteristic, or a spatial characteristic.

96. The system of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

97. A video coding system, the system comprising one or more components for handling instructions for video coding, the one or more components to process the instructions for:
accessing a bit stream comprising a first distortion metric;
concurrently processing Lagrangian cost functions for a first plurality of modes associated with the first distortion metric;
comparing the Lagrangian cost functions of the first plurality of modes, wherein the comparison involves a ranking of the Lagrangian cost functions of first plurality of modes;
selecting a first subset of modes from the first plurality of modes based on the comparison;
arrange an order of the first subset of modes based on data from a previous mode ranking;
concurrently processing Lagrangian cost functions for the first subset of modes using a second distortion metric;
comparing the Lagrangian cost functions of the first subset of modes, wherein the comparison involves a ranking of the Lagrangian cost functions of the first subset of modes;
selecting a second subset of modes from the first plurality of modes based on the ranking of the Lagrangian cost functions of the first subset of modes; and
arrange an order of the second subset of modes based on data from a previous mode ranking.

98. The system of enumerated example embodiment wherein the distortion metrics comprise information associated with video display characteristics, the video display characteristics comprising screen display size, a measurement of video processing performance, a distortion characteristic, a temporal characteristic, or a spatial characteristic.

99. The system of enumerated example embodiment wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

100. A method, comprising the steps of:
determining a set of image related distortion metrics for at least one of:
each of a plurality of video coding modes; or
each of a plurality of channels that are configured to receive an encoded bitstream from a video encoder;
selecting a distortion metric from among the distortion metric set based on one or more of:
a cost estimate associated with the video coding modes; or
a target bit rate associated with one of the channels that corresponds to one or more characteristics of a video display that receives the video bitstream from the channel; and
encoding a pixel block or other than block based image portion based on the selected distortion metric.

101. The method as recited in enumerated example embodiment 100 wherein the determining a set step comprises the steps of:
determining a first set of Lagrangian cost values for a plurality of coding modes using a first distortion metric; and
determining a second set of Lagrangian cost values for the plurality of coding modes using a second distortion metric;
wherein the selecting a distortion metric step comprises selecting one of the plurality of coding modes based on the first set of Lagrangian cost values and the second set of Lagrangian cost values; and
wherein the encoding step comprises encoding a pixel block using the selected coding mode.

102. The method as recited in enumerated example embodiment 100, further, comprising the steps of:
sending a compressed bit stream from a video encoder to a plurality of channels, wherein the channels comprise a target bit rate and a plurality of distortion metrics;
matching one of the distortion metrics from one of the channels to a characteristic of a first video display; and
sending video data to the first video display with the distortion metric that matches the characteristic of the first video display.

103. The method as recited in enumerated example embodiment 100 wherein video coding is performed under multiple distortion constraints, wherein the determining a set comprises the steps of:
associating distortion metrics to a plurality of candidate modes, wherein each of the distortion metrics are associated with a group of candidate modes; and
wherein the method further comprises the steps of:
concurrently processing the plurality of candidate modes with a respective Lagrangian cost function; and for each distortion metric, ranking the candidate modes within each group according to the Lagrangian cost functions;
wherein the selecting a distortion metric step comprises the steps of:
comparing the ranking of the candidate modes amongst each group of candidate modes;
selecting the group of candidate modes with a highest ranking; and
selecting a target mode for a video display based on selecting a highest-ranking candidate mode within the selected group of candidate modes.

104. The method as recited in enumerated example embodiment 100 wherein the determining a set step comprises the step of:
processing a bit stream of video information to determine a first Lagrangian cost function for a first mode with a first distortion metric; and
wherein the selecting a distortion metric step comprises the steps of:
comparing the first Lagrangian cost function with a threshold; and
if the first Lagrangian cost function is greater than the threshold, eliminating the mode with the first distortion metric; and
if the first Lagrangian cost function is less than the threshold, determining a second Lagrangian cost function for a first mode with a second distortion metric.

105. The method as recited in enumerated example embodiment 100 wherein the determining a set step comprises the step of
for a plurality of modes, each of the nodes having a plurality of distortion metrics, processing a bit stream of video information to determine a Lagrangian cost function with a distortion metric for each mode;
wherein the selecting a distortion metric step comprises the steps of:
comparing each Lagrangian cost function with a threshold; and
if the respective Lagrangian cost function is greater than the threshold, eliminating the respective mode with the respective distortion metric; and
if the respective Lagrangian cost function is less than the threshold, determining a subsequent Lagrangian cost function for a respective mode with a subsequent distortion metric, and
wherein the respective Lagrangian cost functions are serially determined and compared with the threshold until all distortion metrics for all modes have been compared or eliminated.

106. A system, comprising:
means for determining a set of image related distortion metrics for at least one of:
each of a plurality of video coding modes; or
each of a plurality of channels that are configured to receive an encoded bitstream from a video encoder;
means for selecting a distortion metric from among the distortion metric set based on one or more of:
a cost estimate associated with the video coding modes; or
a target bit rate associated with one of the channels that corresponds to one or more characteristics of a video display that receives the video bitstream from the channel; and
means for encoding a pixel block or other than block based image portion based on the selected distortion metric; or
means for performing one or more of the steps as recited in one or more of enumerated example embodiments 100-105.

107. A video encoder, comprising:
at least one processor; and
a computer readable storage medium comprising encoded instructions, which when executing with the at least one processor, cause the video encoder to perform a process comprising:
determining a set of image related distortion metrics for at least one of:
each of a plurality of video coding modes; or
each of a plurality of channels that are configured to receive an encoded bitstream from a video encoder;
selecting a distortion metric from among the distortion metric set based on one or more of:
a cost estimate associated with the video coding modes; or
a target bit rate associated with one of the channels that corresponds to one or more characteristics of a video display that receives the video bitstream from the channel; and
encoding a pixel block or other than block based image portion based on the selected distortion metric; or
one or more of the steps as recited in one or more of enumerated example embodiments 100-105.

108. A computer readable storage medium product, comprising instructions, which when executing with the at least one processor, cause the video encoder to perform a process comprising:
determining a set of image related distortion metrics for at least one of:
each of a plurality of video coding modes; or
each of a plurality of channels that are configured to receive an encoded bitstream from a video encoder;
selecting a distortion metric from among the distortion metric set based on one or more of:
a cost estimate associated with the video coding modes; or
a target bit rate associated with one of the channels that corresponds to one or more characteristics of a video display that receives the video bitstream from the channel; and
encoding a pixel block or other than block based image portion based on the selected distortion metric; or
performing one or more of the steps as recited in one or more of enumerated example embodiments 100-105.

109. An video encoding or computing apparatus, comprising:
a processing component;
and a component readable storage medium, comprising encoded instructions, which when executing with the processing component, cause the apparatus to perform steps comprising:
determining a set of image related distortion metrics for at least one of:
each of a plurality of video coding modes; or
each of a plurality of channels that are configured to receive an encoded bitstream from a video encoder;
selecting a distortion metric from among the distortion metric set based on one or more of:
a cost estimate associated with the video coding modes; or
a target bit rate associated with one of the channels that corresponds to one or more characteristics of a video display that receives the video bitstream from the channel; and
encoding a pixel block or other than block based image portion based on the selected distortion metric; or
one or more of the steps as recited in one or more of enumerated example embodiments 100-105.

EXTENSIONS, ALTERNATIVES AND MISCELLANEOUS

Example embodiments relating to video compression under multiple distortion constraints are thus described. In this foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for video coding, comprising:
sending a compressed bit stream from a video encoder to a plurality of channels, wherein the channels are associated with a target bit rate and a plurality of distortion metrics, the distortion metrics comprising information associated with video display characteristics, the video display characteristics comprising a screen display size, a measurement of video processing performance, a distortion characteristic, a temporal characteristic, or a spatial characteristic;
ranking the plurality of distortion metrics in each channel based on associating distortion metrics' information for a video display characteristic with a similar characteristic of a first video display;
relating one or more of the distortion metrics from one of the channels to the characteristic of the first video display by selecting one or more high ranking distortion metrics;
eliminating unrelated distortion metrics, wherein the one or more high ranking distortion metrics identify one or more video display features; and
sending video data to the first video display with the one or more distortion metrics that relate to the characteristic of the first video display.

2. The method of claim 1, wherein the ranking further comprises:
determining a complexity of the one or more distortion metrics; and
selecting the one or more high ranking distortion metrics based on the complexity.

3. The method of claim 1, wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

4. A non-transitory computer readable storage medium product, comprising instructions, which when executing with at least one processor, causes a video encoder to perform a process, the process comprising:
sending a compressed bit stream from a video encoder to a plurality of channels, wherein the channels are associated with a target bit rate and a plurality of distortion metrics, the distortion metrics comprising information associated with video display characteristics, the video display characteristics comprising a screen display size, a measurement of video processing performance, a distortion characteristic, a temporal characteristic, or a spatial characteristic;
ranking the plurality of distortion metrics in each channel based on associating distortion metrics' information for a video display characteristic with a similar characteristic of a first video display;
relating one or more of the distortion metrics from one of the channels to the characteristic of the first video display by selecting one or more high ranking distortion metrics;
eliminating unrelated distortion metrics, wherein the one or more high ranking distortion metrics identify one or more video display features; and
sending video data to the first video display with the one or more distortion metrics that relate to the characteristic of the first video display.

5. A system comprising at least one processor and a video encoder, the system being configured to execute instructions with the at least one processor and the video encoder to perform a process, the process comprising:
sending a compressed bit stream from a video encoder to a plurality of channels, wherein the channels are associated with a target bit rate and a plurality of distortion metrics, the distortion metrics comprising information associated with video display characteristics, the video display characteristics comprising a screen display size, a measurement of video processing performance, a distortion characteristic, a temporal characteristic, or a spatial characteristic;
ranking the plurality of distortion metrics in each channel based on associating distortion metrics' information for a video display characteristic with a similar characteristic of a first video display;
relating one or more of the distortion metrics from one of the channels to the characteristic of the first video display by selecting one or more high ranking distortion metrics;
eliminating unrelated distortion metrics, wherein the one or more high ranking distortion metrics identify one or more video display features; and
sending video data to the first video display with the one or more distortion metrics that relate to the characteristic of the first video display.

6. The non-transitory computer readable storage medium of claim 4, wherein the ranking further comprises:
determining a complexity of the one or more distortion metrics; and
selecting the one or more high ranking distortion metrics based on the complexity.

7. The non-transitory computer readable storage medium of claim 4, wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

8. The non-transitory computer readable storage medium of claim 4, wherein the process further comprises:
before sending the compressed bit stream, encoding a pixel block using a Lagrangian cost function, wherein the Lagrangian cost function includes distortion information from the encoding that comprises a plurality of modes with the plurality of distortion metrics that has the corresponding bit target rates.

9. The system of claim 5, wherein the ranking further comprises:
   determining a complexity of the one or more distortion metrics; and
   selecting the one or more high ranking distortion metrics based on the complexity.

10. The system of claim 5, wherein the distortion metrics further comprise information associated with characteristics of a plurality of video displays, the characteristics of the plurality of video displays comprising parameters for usage of the plurality of the video displays, parameters for indicating an importance of one or more of the video displays, parameters for types of design for the video displays, parameters for types of display technologies for the plurality of video displays, and parameters for ranking the plurality of video displays using any combination of the characteristics.

11. The system of claim 5, wherein the process further comprises:
   before sending the compressed bit stream, encoding a pixel block using a Lagrangian cost function, wherein the Lagrangian cost function includes distortion information from the encoding that comprises a plurality of modes with the plurality of distortion metrics that has the corresponding bit target rates.

* * * * *